United States Patent [19]

Lawrence

[11] Patent Number: 5,064,338
[45] Date of Patent: Nov. 12, 1991

[54] IMPLEMENT MOUNTING APPARATUS FOR TRACTORS AND MOWERS

[75] Inventor: Phillip G. Lawrence, Spring Lake, Mich.

[73] Assignee: Lawrence Inc., Spring Lake, Mich.

[21] Appl. No.: 455,960

[22] Filed: Dec. 22, 1989

[51] Int. Cl.$^5$ .............................................. E02F 3/04
[52] U.S. Cl. .............................. 414/685; 37/DIG. 3; 56/DIG. 9; 180/53.7; 280/415.1; 280/416.2; 298/25; 414/608; 414/703; 414/722; 414/912; 414/723
[58] Field of Search ............... 414/498, 608, 680, 685, 414/686, 697, 703, 722, 723, 724, 725, 912; 280/415.1, 416.2, 476.1, 481; 298/25.5; 180/53.7, 53.8; 37/117.5, 118 R, DIG. 3; 56/DIG. 9; 172/273, 274

[56] References Cited

U.S. PATENT DOCUMENTS

| 1,455,549 | 5/1923 | Robison . |
| 1,591,557 | 7/1926 | Perry . |
| 2,131,326 | 9/1938 | Kaster . |
| 2,256,454 | 9/1941 | Bomar . |
| 2,300,801 | 11/1942 | Parker . |
| 2,319,456 | 5/1943 | Hazen . |
| 2,394,458 | 2/1946 | Lull . |
| 2,473,505 | 6/1949 | Brock . |
| 2,506,139 | 5/1950 | Crosley . |
| 2,533,837 | 12/1950 | Pauley . |
| 2,630,334 | 3/1953 | Ewers . |
| 2,650,732 | 9/1953 | Hartquist . |
| 2,675,139 | 4/1954 | Mercier et al. . |
| 2,701,658 | 2/1955 | Radin et al. . |
| 2,714,460 | 8/1955 | Cook . |
| 2,765,193 | 10/1956 | McGrew . |
| 2,812,089 | 11/1957 | Purpura . |
| 2,820,561 | 1/1958 | Meagher . |
| 2,863,233 | 12/1958 | Johnson ............................ 37/117.5 |
| 2,935,802 | 5/1960 | Wolfe et al. ........................ 37/117.5 |
| 2,956,701 | 10/1960 | Larson . |
| 2,998,891 | 9/1961 | Baur et al. . |

(List continued on next page.)

FOREIGN PATENT DOCUMENTS

| 938419 | 1/1956 | Fed. Rep. of Germany . |
| 1456538 | 1/1969 | Fed. Rep. of Germany . |
| 3400357 | 7/1985 | Fed. Rep. of Germany . |
| 58-20573 | 2/1983 | Japan . |
| 58-185836 | 10/1983 | Japan . |
| 822349 | 10/1959 | United Kingdom . |

Primary Examiner—Robert J. Spar
Assistant Examiner—Donald W. Underwood
Attorney, Agent, or Firm—Price, Heneveld, Cooper, DeWitt & Litton

[57] ABSTRACT

An implement mounting apparatus for use with utility tractors, lawn and garden tractors and riding front mowers and other vehicles which allows removable mounting and use of numerous attachments for performing multiple grounds maintenance, yard and lawn care or gardening functions. A support frame includes an upper member for positioning and a bottom member for supporting implements such as lift forks, a tool organizer, a work platform and housing body. The support frame is rigidly or pivotally mountable on a three-point hitch, a mounting/lift frame having a support strut, or a tow bar assembly. Wheels may be added for use of the apparatus with a tow bar as a trailer. The housing body is useful with a scraper blade as a plow, or may be easily converted to a hopper assembly or scoop by adding hopper or scoop members. The hopper assembly may be opened to dump contained material with a spring biased latch mechanism which may be locked closed. The scoop member is secured in position with the same latch mechanism.

29 Claims, 9 Drawing Sheets

U.S. PATENT DOCUMENTS

| | | |
|---|---|---|
| 3,016,973 | 1/1962 | Williamson . |
| 3,034,587 | 5/1962 | Dorkins et al. . |
| 3,101,128 | 8/1963 | Dane . |
| 3,172,686 | 3/1965 | Beard . |
| 3,242,851 | 3/1966 | Brawley et al. . |
| 3,252,606 | 5/1966 | Pryor ........................... 37/117.5 X |
| 3,283,933 | 11/1966 | Vander Wal . |
| 3,379,281 | 4/1968 | Calletti et al. . |
| 3,391,949 | 7/1968 | Abbott . |
| 3,410,432 | 11/1968 | Foss et al. . |
| 3,417,886 | 12/1968 | Stuart . |
| 3,480,167 | 11/1969 | Varilek . |
| 3,498,638 | 3/1970 | Magruder . |
| 3,511,400 | 5/1970 | Oswald . |
| 3,643,993 | 2/1972 | Asadurian . |
| 3,649,041 | 3/1972 | Cervantez . |
| 3,716,253 | 2/1973 | Gniffke et al. . |
| 3,760,883 | 9/1973 | Birk . |
| 3,794,195 | 2/1974 | Clevenger et al. . |
| 3,829,129 | 8/1974 | Newcomer ...................... 280/476.1 |
| 3,830,314 | 8/1974 | Aitkenhead . |
| 3,854,542 | 12/1974 | Jesswein et al. . |
| 3,877,593 | 4/1975 | Sleziak . |
| 3,889,833 | 6/1975 | Thomas . |
| 3,905,527 | 9/1975 | Chamberlain . |
| 3,912,092 | 10/1975 | Bolton et al. . |
| 3,918,600 | 11/1975 | Lyon . |
| 3,957,240 | 5/1976 | Johansson . |
| 3,966,064 | 6/1976 | Felburn . |
| 4,027,773 | 6/1977 | Kenworthy .......................... 414/703 |
| 4,042,141 | 8/1977 | Schweigert . |
| 4,090,725 | 5/1978 | Perin . |
| 4,095,714 | 6/1978 | Schuster . |
| 4,136,792 | 1/1979 | Wilson . |
| 4,215,496 | 8/1980 | Wehr . |
| 4,277,008 | 7/1981 | McCleary . |
| 4,280,711 | 7/1981 | Gorder . |
| 4,340,240 | 7/1982 | Anderson . |
| 4,341,393 | 7/1982 | Gordon et al. . |
| 4,389,155 | 6/1983 | Absher . |
| 4,488,697 | 12/1984 | Garvey . |
| 4,596,347 | 6/1986 | Hite . |
| 4,674,933 | 6/1987 | Brown . |
| 4,681,335 | 7/1987 | Ledermann et al. . |
| 4,688,819 | 8/1987 | Reilly et al. . |
| 4,718,816 | 1/1988 | King . |
| 4,746,254 | 5/1988 | Langenfield et al. ................ 414/703 |
| 4,753,568 | 6/1988 | Langenfeld et al. . |
| 4,756,661 | 7/1988 | Smart . |
| 4,850,789 | 7/1989 | Zimmerman ................. 280/416.2 X |
| 4,854,809 | 8/1989 | Rhodes ........................... 414/703 X |

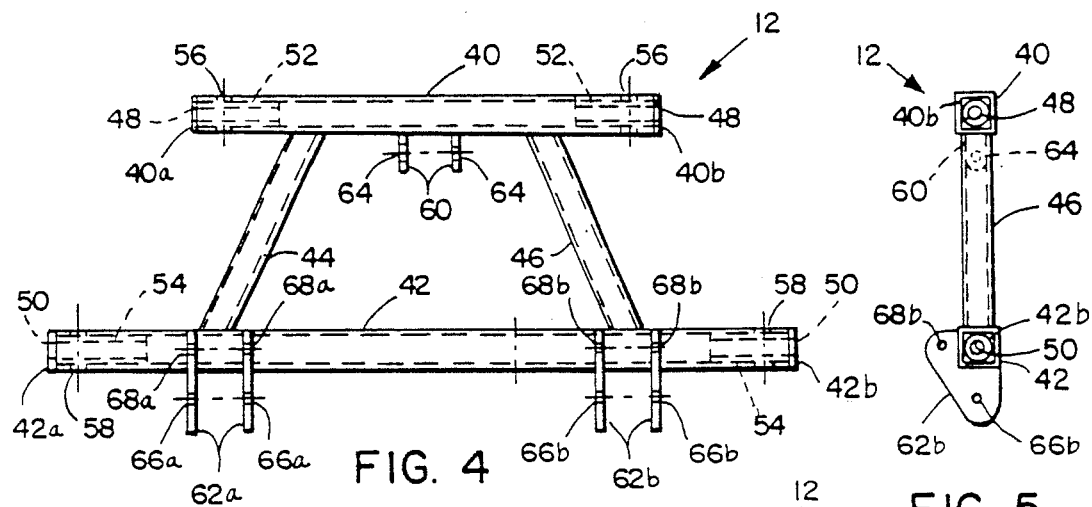
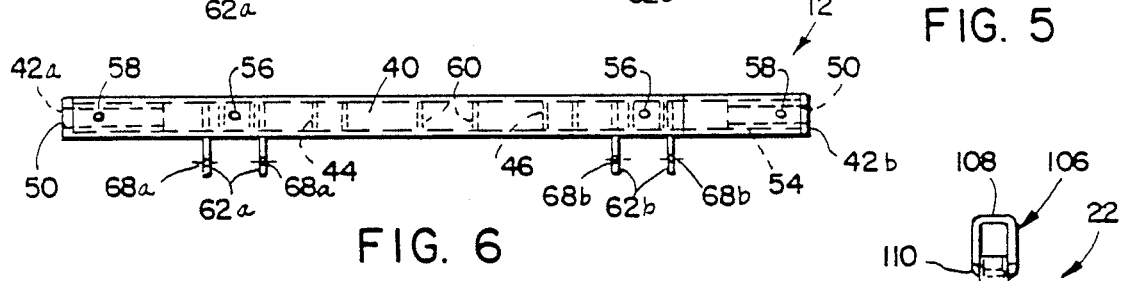
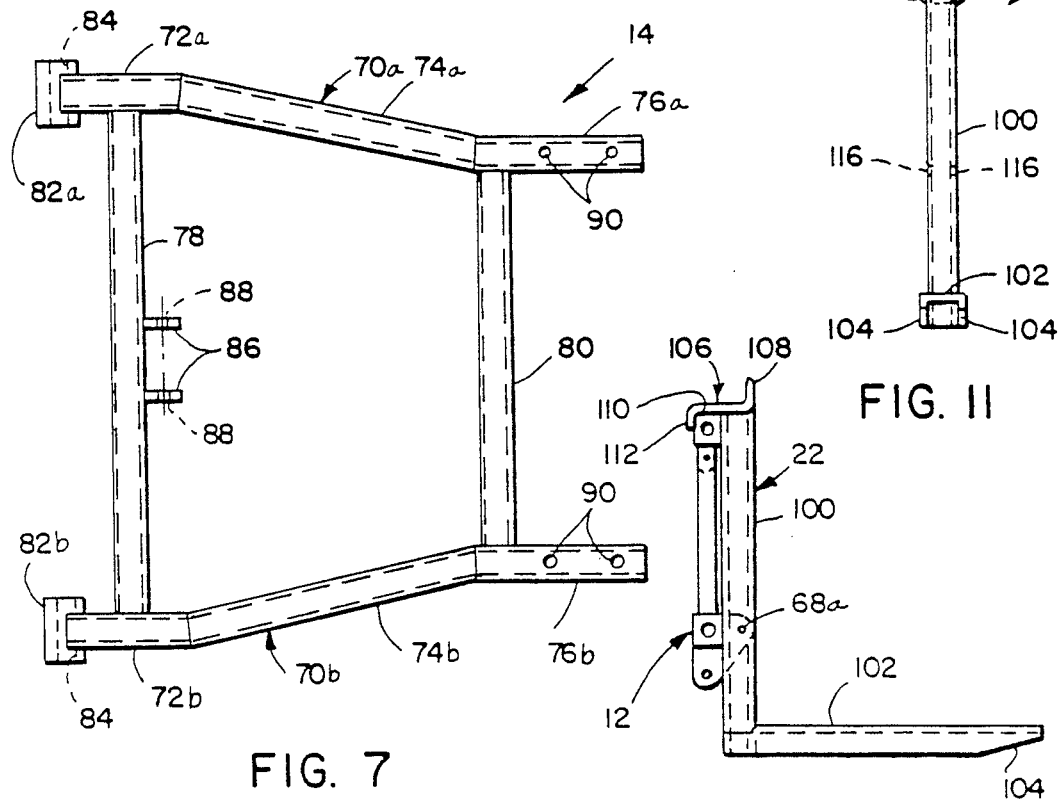

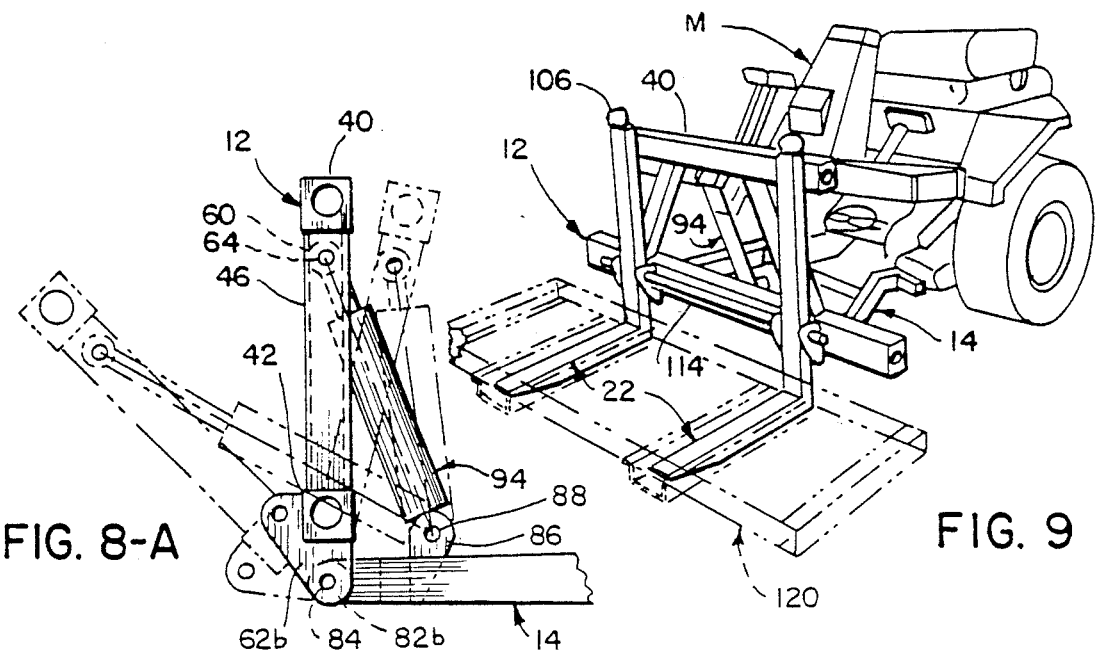
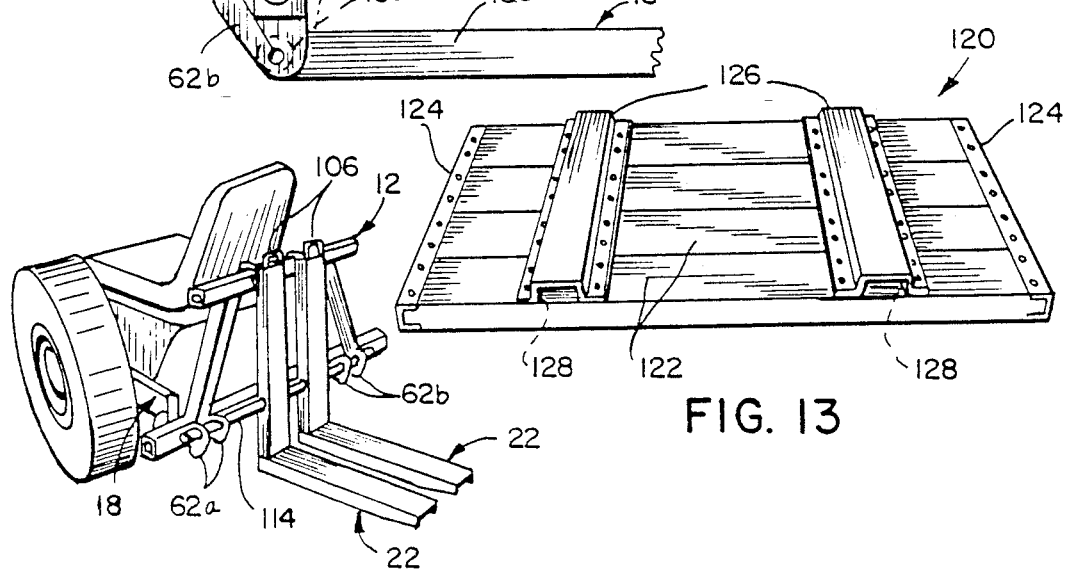

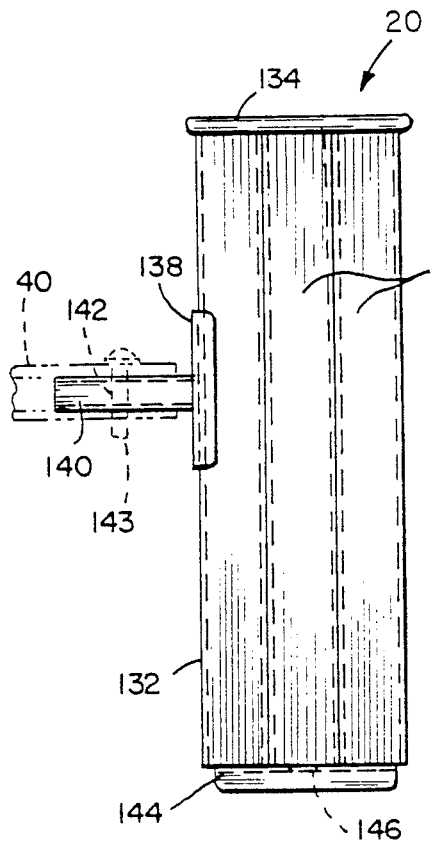
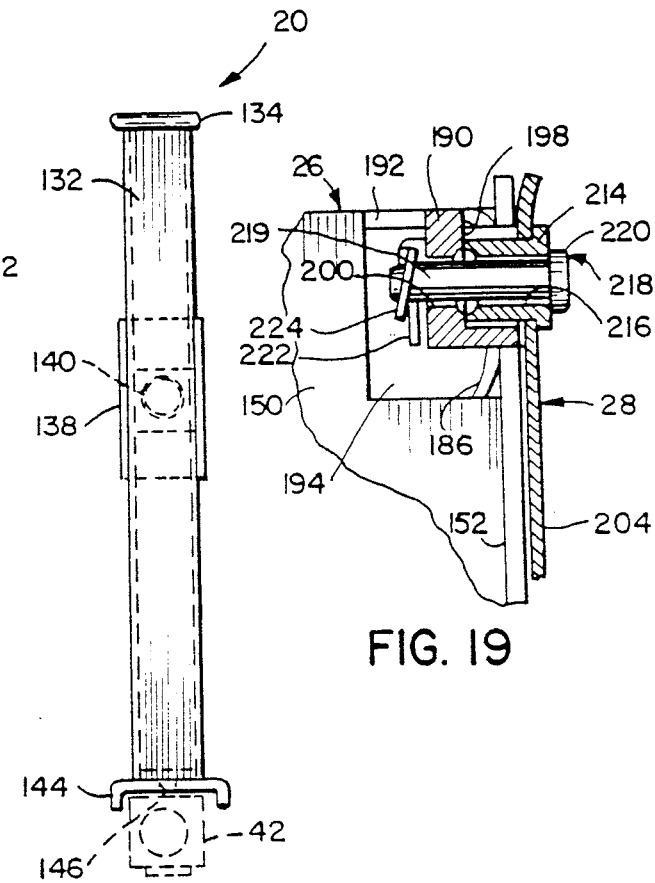
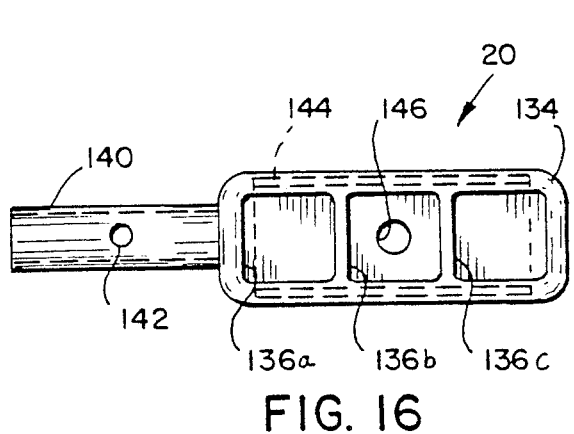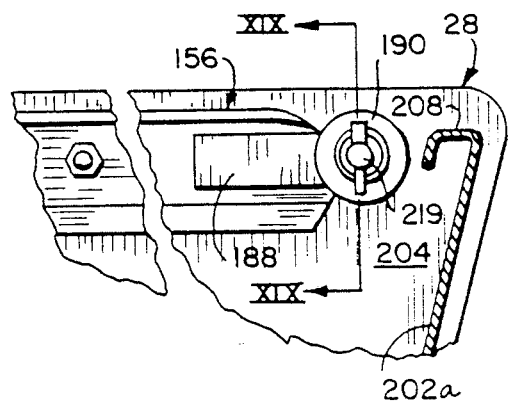

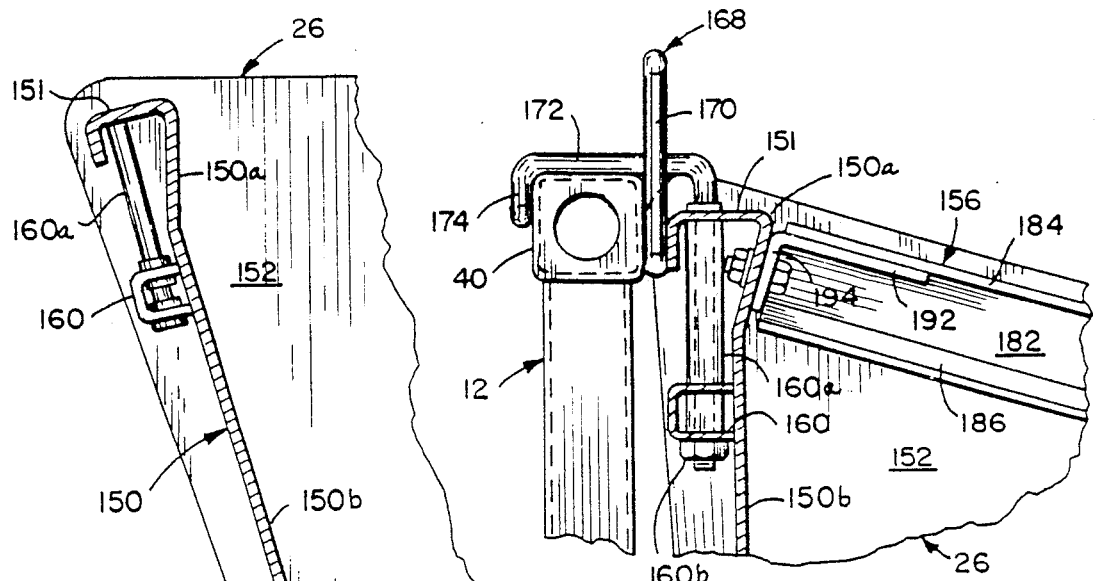
FIG. 17
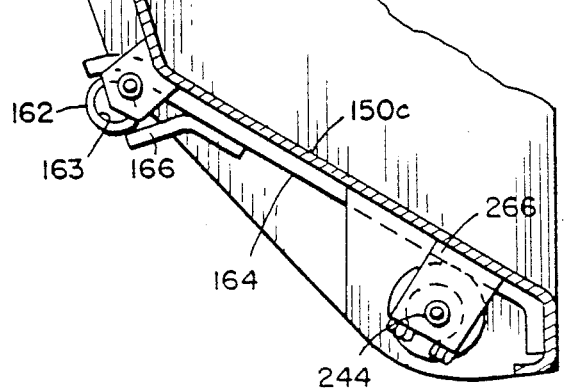
FIG. 20
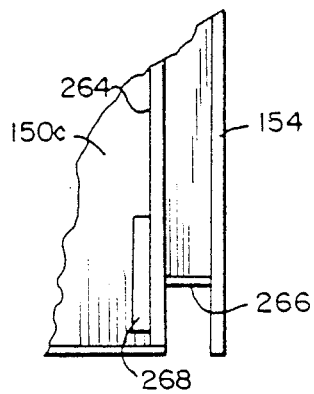
FIG. 17-A
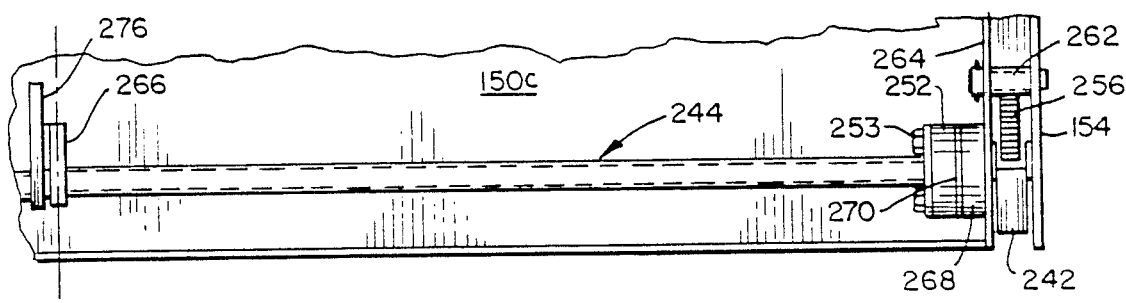
FIG. 23

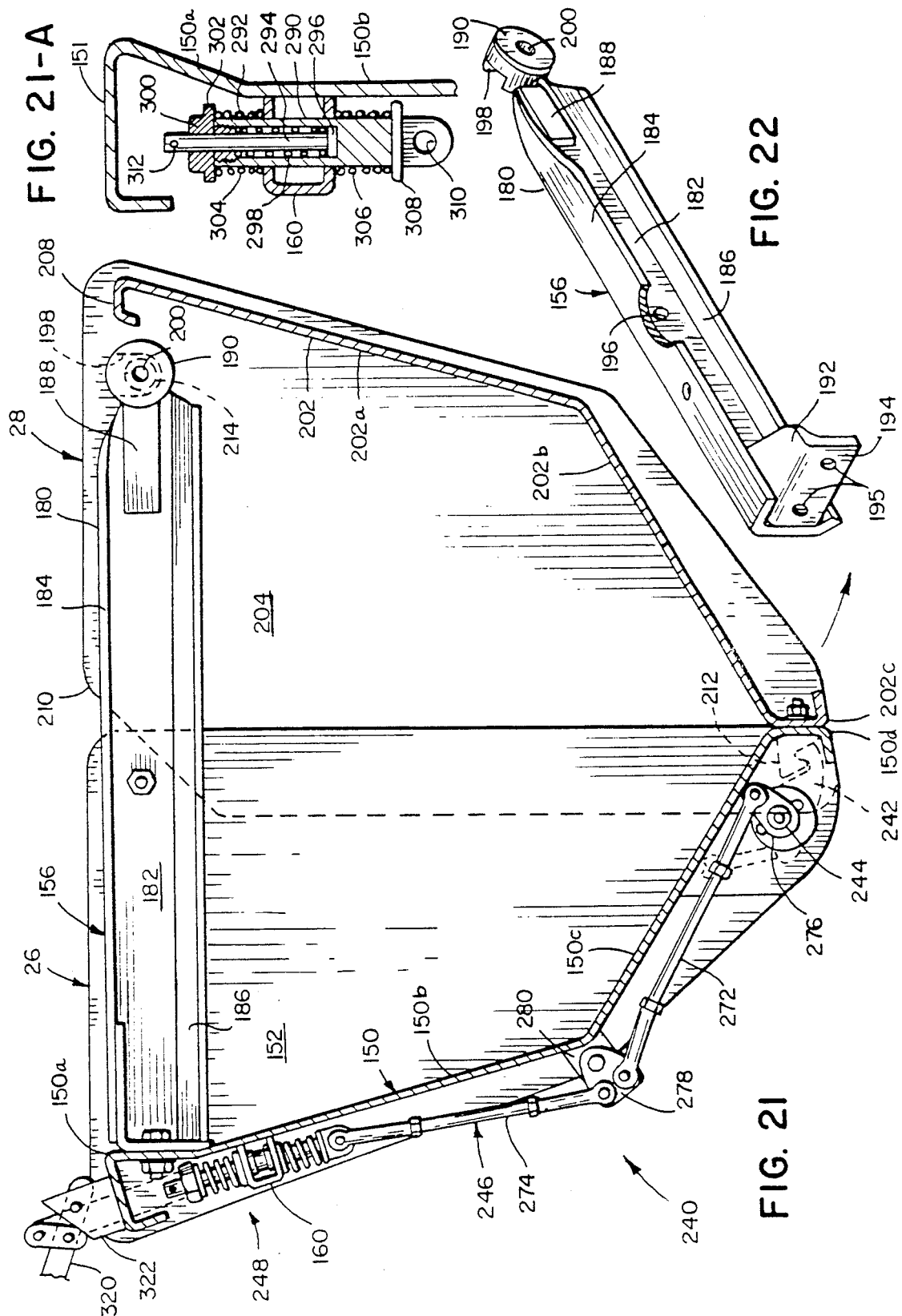

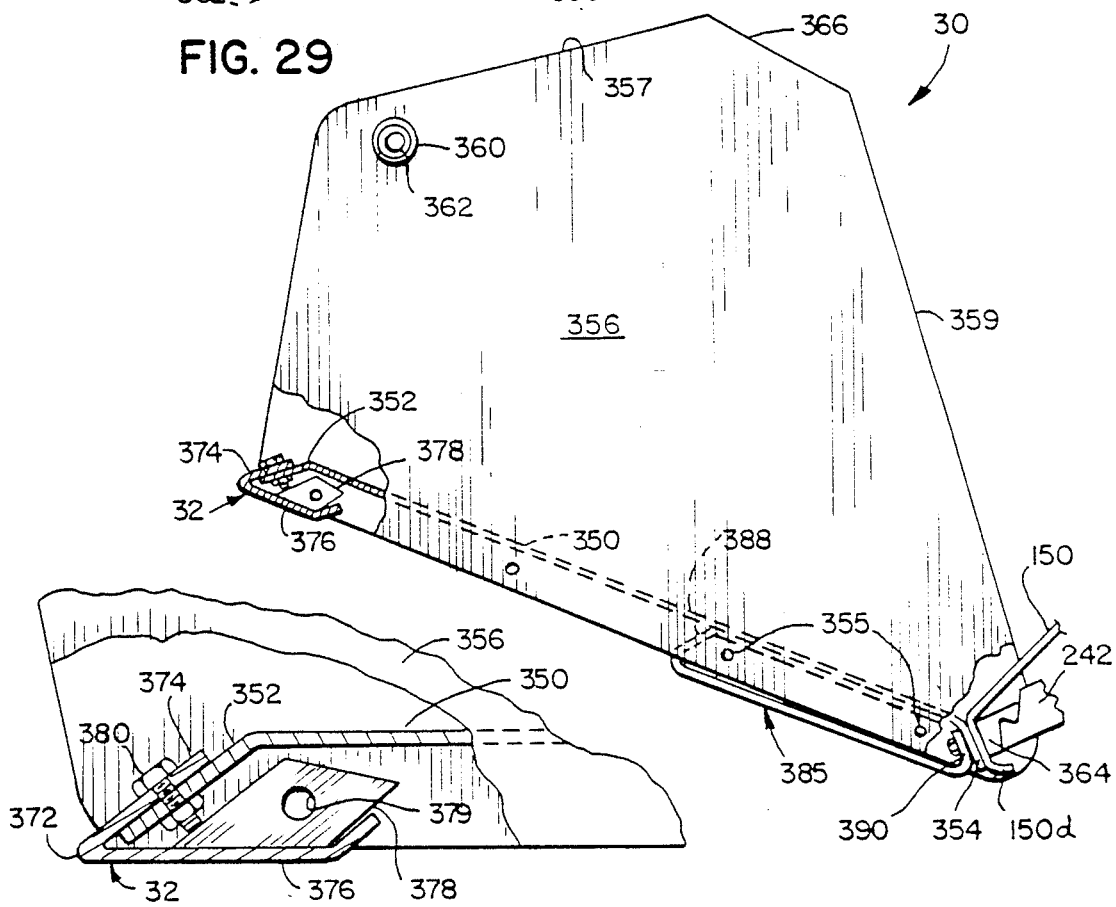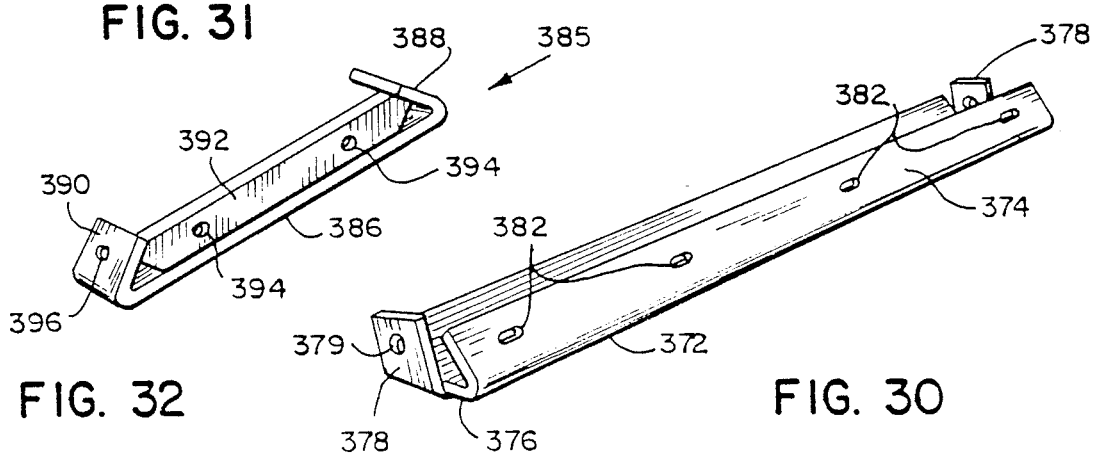

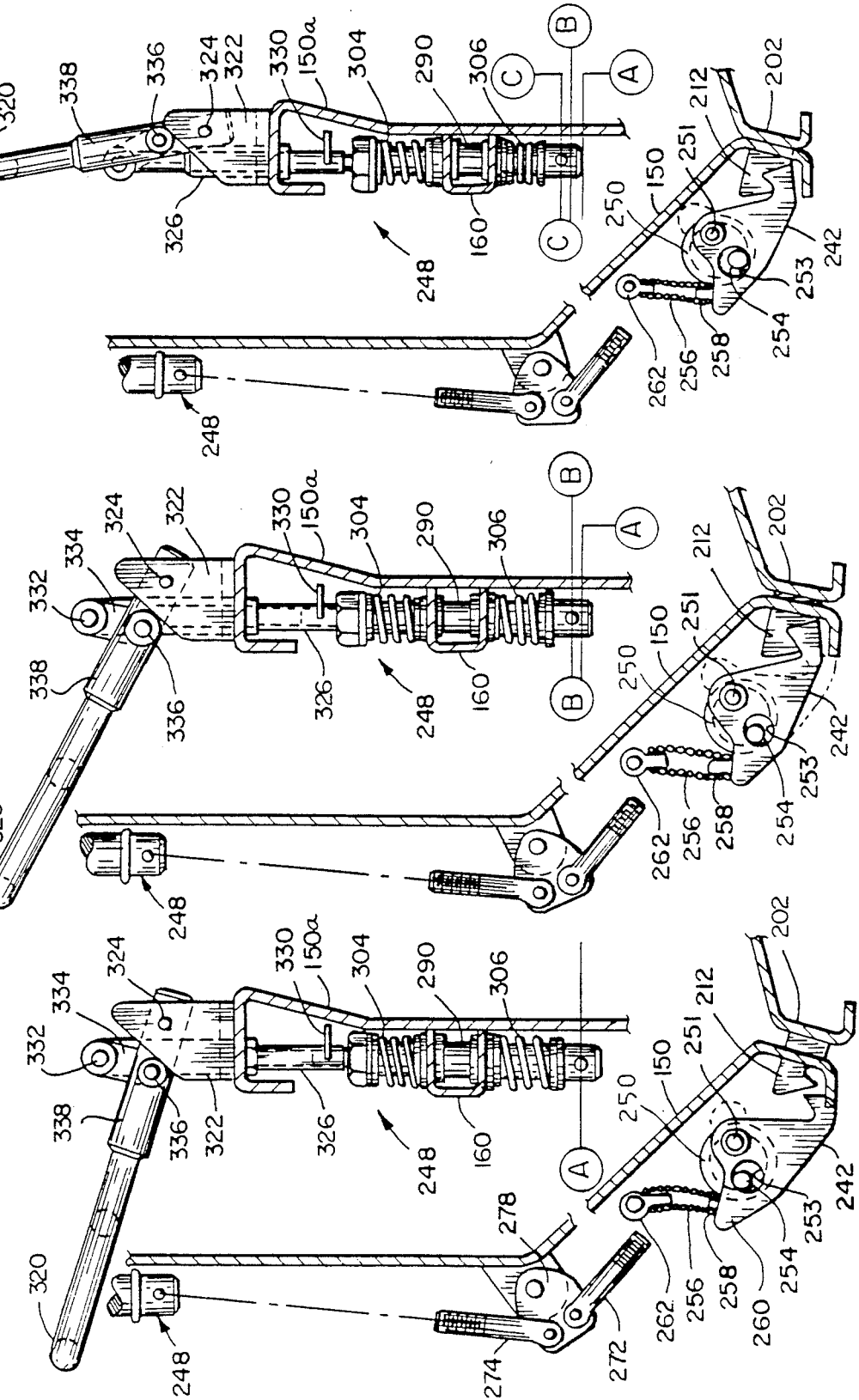

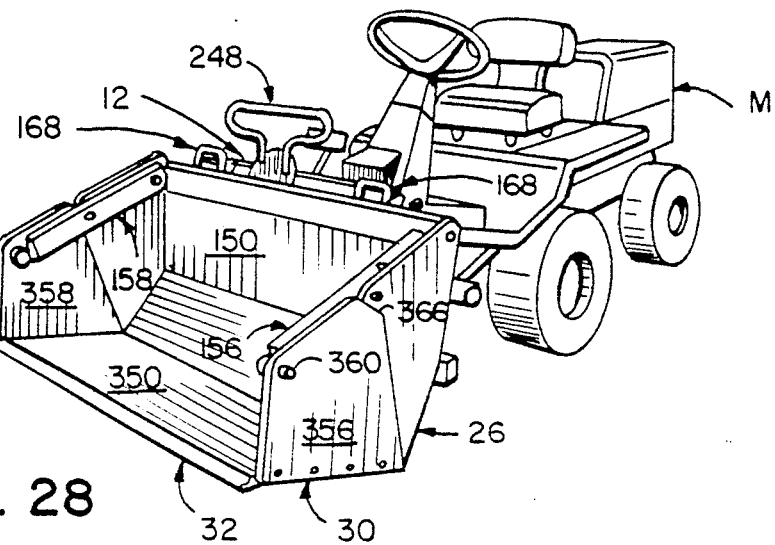
FIG. 28
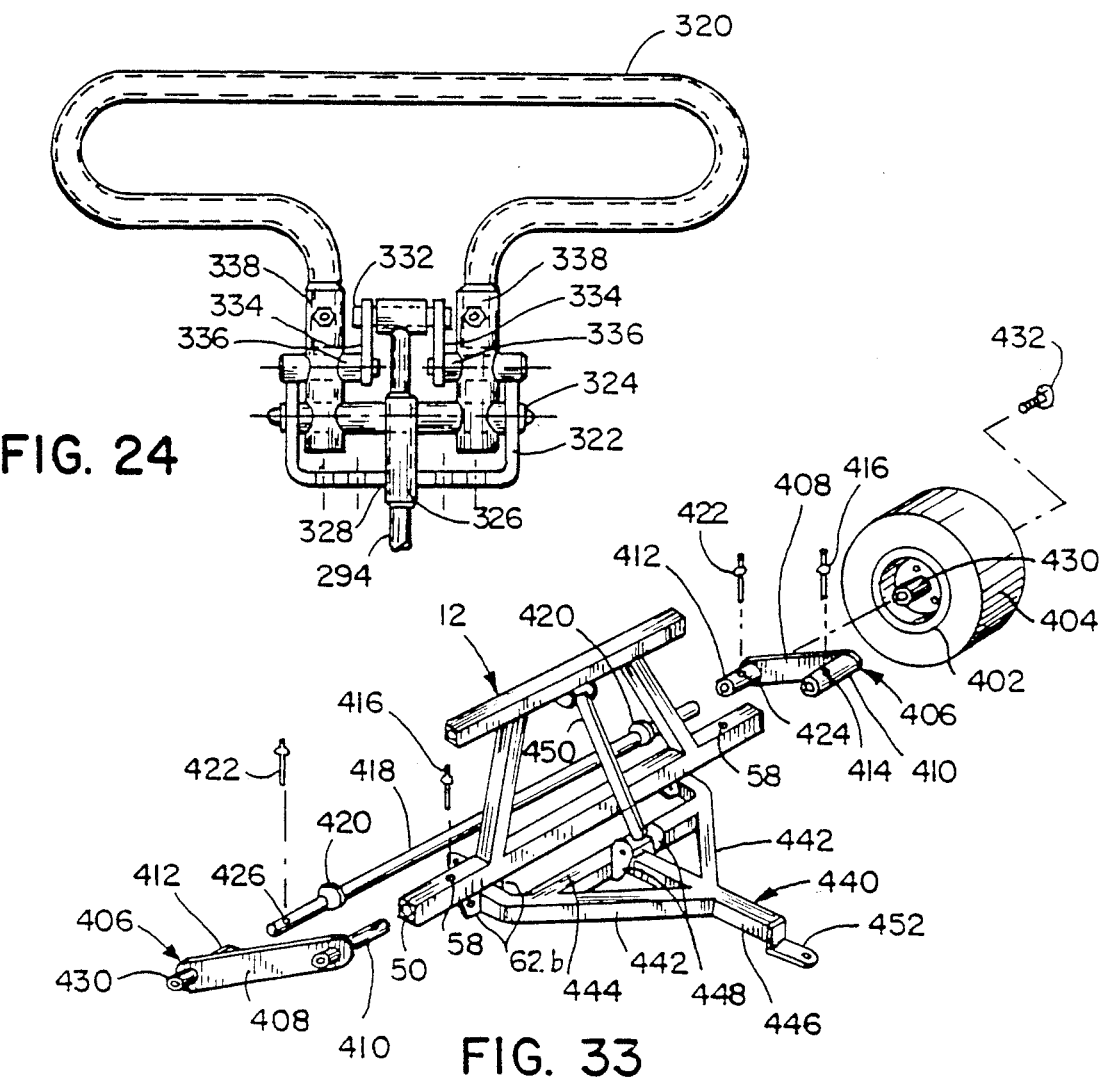
FIG. 24
FIG. 33

IMPLEMENT MOUNTING APPARATUS FOR TRACTORS AND MOWERS

BACKGROUND OF THE INVENTION

This invention relates to work implements for grounds maintenance vehicles, and, more particularly, to an apparatus system for mounting a series of work implements alone or in combination with one another on a universally compatible support frame to provide both lifting and hauling capabilities for various brands of utility tractors, lawn and garden tractors and front mowers.

Conventional tractors, riding front mowers and other lawn and garden work vehicles normally provide attachments or work implements such as mower decks, snow plows or snow blowers, rototillers, disks, plows or planting apparatus. Usually, specific brackets and attachment parts as well as uniquely designed work implements are required for each different brand of tractor or front mower since the chassis and arrangement of components on each vehicle is different. With such conventional systems, unusual implements such as scoops and dump buckets are either unavailable or highly expensive because they are made specifically for each different brand of vehicle. When available, changeover between various implements is both time-consuming and difficult and requires many specialized parts.

Particular problems encountered with conventionally known grounds maintenance vehicles include the provision of lifting and hauling capability for heavy loads and objects. Often, an operator must attach a flat or sided trailer to the vehicle and manually load trees or other bulky objects with the help of other persons.

Another problem is the carrying of tools and various pieces of equipment to remote areas of a property simultaneously with the hauling of a load such as a tree for planting. Often, there was no place to include tools other than laying them loose on a trailer or having the tractor operator carry them personally if a large load of dirt, tree or other object was being carried. This caused greater expense for commercial establishments, schools and colleges having large and continuing grounds maintenance and landscaping needs because of the added requirements for additional workmen or additional vehicles.

Yet another problem is the lack of any ability to interchange available implements on front mount riding mowers as well as rear attachment tractors. As above, this created the need to provide specialized implements for each different vehicle brand.

SUMMARY OF THE INVENTION

Accordingly, the present invention both recognizes and solves the above needs and problems by providing an implement mounting apparatus for tractors, riding lawn mowers and other grounds maintenance vehicles which has universal compatibility amongst different brands by means of a common support frame which can be fitted conveniently to both front mount riding mowers and rear mount three-point hitch tractors of various sizes including smaller tractors and mowers typically not having lifting capabilities. Alternately, the common support frame can be used as a trailer by fitting wheel attachments and a tow bar frame to it. The apparatus provides a series of rugged, lightweight work implements including lift fork sets, a tote platform, a tool carrier for hand tools and the like, as well as hoppers, scoops and plows. In rapid fashion, the apparatus may be changed by one person from one implement to another such as from a work platform used to transport shrubs or fertilizer to a large multi-cubic foot hopper for hauling bark, debris or dirt and dumping it as desired. The apparatus also provides lifting capabilities with various of the implements. All implements used with the apparatus can be handled by a single person and are easily interchanged using hanger brackets and quick release connecting pins.

In one aspect, the invention is an implement mounting apparatus for use with tractors, riding front mowers and the like comprising a support frame for mounting and holding at least one work implement during use. The frame includes a first support member extending generally horizontally and having opposed ends. A second support member also extends generally horizontally with opposed ends and is spaced below the first support member and includes means for supporting at least one work implement on said frame for access and use on one side of said frame. A pair of brace members extends between and spaces the first and second support members vertically apart from one another. The first support member includes upper surface means for positioning at least one work implement on the frame for access and use on one side of the frame. Hitch means are included on the first and second support members for mounting the frame on a mount on a tractor, lawn mower, tow bar or other vehicle or support. The hitch means are spaced inwardly from the ends of the support members to leave the ends free and exposed. The hitch means are also positioned on the support members to avoid interference with the upper surface means and any work implement supported on the frame.

Preferably, the apparatus includes attachment means at at least one end of one of the first and second support members for securing at least one work implement to the frame. Specifically, the attachment may include an opening in one end of the support member for mounting a tool support or the like while another work implement is mounted on the upper surface means. The support frame may be mounted on a mounting/lift frame for front mount riding mowers or be connected to a three-point hitch for rear attachment tractors. Also, wheel support means may be mounted on the frame such that the frame may be used as a trailer with a tow bar frame.

The invention includes various implements such as lift forks, a tool support including an upwardly opening compartment for receiving and supporting tools therein, a work platform for use in combination with the lift forks, and a housing body which may be combined with a hopper member to form a clam-shell type opening hopper assembly, or with a scoop member to form a scoop assembly. The hopper member is designed to be pivotally supported on projecting support arms and released for opening and dumping via a latch assembly by means of a spring biased handle movable between open, closed and overcenter lock positions.

In yet other aspects of the invention, the support frame is combined with wheel support means for mounting a pair of spaced wheels on the frame and a tow bar frame mounted to the hitch means on the support frame. The tow bar frame extends outwardly on the side of the support frame opposite to the one side and has a support strut extending upwardly to a portion of the hitch means on the first support member. Thus, the support frame is mobile and may be towed by a vehicle such as a tractor or front mower while supporting the various implements as described above.

These and other objects, advantages, purposes and features of the invention will be more apparent from a study of the following description taken in conjunction with the drawings.

BRIEF DESCRIPTION OF THE DRAWINGS

FIG. 4 is a front elevation of the support frame;

FIG. 5 is an end elevation of the support frame;

FIG. 6 is a top plan view of the support frame;

FIG. 7 is a top plan view of the mounting/lift frame for securing the support frame to the front of a front mount riding mower;

FIG. 8A is a side view of the mounting/lift frame with the support frame pivotally mounted thereon and movable with a hydraulic cylinder;

FIG. 8B is a side view of the three-point hitch mounting of the support frame and movable with a hydraulic cylinder;

FIG. 9 is a perspective view of a pair of lift forks supporting a work platform on the support frame at the front of a front mount riding mower;

FIG. 10 is a side view of a lift fork mounted on the support frame;

FIG. 11 is a front elevation of a lift fork for use with the present invention;

FIG. 12 is a rear perspective view of the support frame mounted on a three-point hitch at the rear of a tractor and including a pair of lift forks mounted in adjusted positions;

FIG. 13 is a bottom perspective view of the work platform for use with the lift forks in the present invention;

· FIG. 14 is a front elevation of the tool support of the present invention;

FIG. 15 is an end elevation of the tool support shown in FIG. 14;

FIG. 16 is a plan view of the tool support shown in FIGS. 14 and 15;

FIG. 17 is a fragmentary, sectional end elevation of the housing body of the present invention;

FIG. 17A is a rear view of one end of the housing body shown in FIG. 17;

FIG. 18 is a fragmentary, sectional end elevation of the hopper assembly mounted showing the ends of the projecting support arms mounted on the housing body with the hopper member mounted thereon;

FIG. 19 is a sectional front elevation of the pivot joint between the hopper member and housing body at the end of one of the support arms taken along plane XIX—XIX of FIG. 18;

FIG. 20 is a fragmentary, end elevation of the housing body positioned on the upper surface of the support frame shown partially in section;

FIG. 21 is a sectional end elevation of the hopper assembly including the releasable latch assembly;

FIG. 21A is a sectional view of the spring biasing means for the handle of the releasable latch assembly;

FIG. 22 is a perspective view of one of the projecting support arms for mounting on the housing body to support the hopper or scoop member;

FIG. 23 is a fragmentary, rear elevation of a portion of the releasable latch assembly taken near the bottom of the housing body;

FIG. 24 is a front elevation of the pivotable handle assembly for use with the releasable latch assembly;

FIG. 25A is a sectional end elevation showing the handle assembly depressed to open the releasable latch assembly;

FIG. 25B is a sectional end elevation showing the releasable latch assembly in opened position corresponding to the handle position of FIG. 25A;

FIG. 26A is a sectional end elevation showing the handle assembly in normal closed position;

FIG. 26B is a sectional end elevation of the releasable latch assembly in closed position corresponding to the handle position shown in FIG. 26A;

FIG. 27A is a sectional end elevation of the handle assembly in locked position to prevent opening of the releasable latch assembly;

FIG. 27B is a sectional end elevation of the releasable latch assembly in locked position corresponding to the position of the locked handle in FIG. 27A;

FIG. 28 is a perspective view of the implement mounting apparatus including the scoop assembly mounted on the support frame on a front mount riding mower;

FIG. 29 is an end elevation of the scoop member with portions broken away to reveal the scraper blade mounted thereon and latching to the housing body;

FIG. 29A is a fragmentary, plan view of one end of the scoop member of FIG. 29;

FIG. 30 is a perspective view of the scraper blade assembly;

FIG. 31 is a fragmentary, enlarged, side elevation with portions broken away of the scraper blade assembly mounted on the scoop member;

FIG. 32 is a perspective view of the skid shoe for mounting on the scoop member; and FIG. 33 is a fragmentary, perspective, exploded view of the wheel support assemblies and tow bar frame for converting the support frame to a trailer.

DESCRIPTION OF THE PREFERRED EMBODIMENTS

Figure 1:
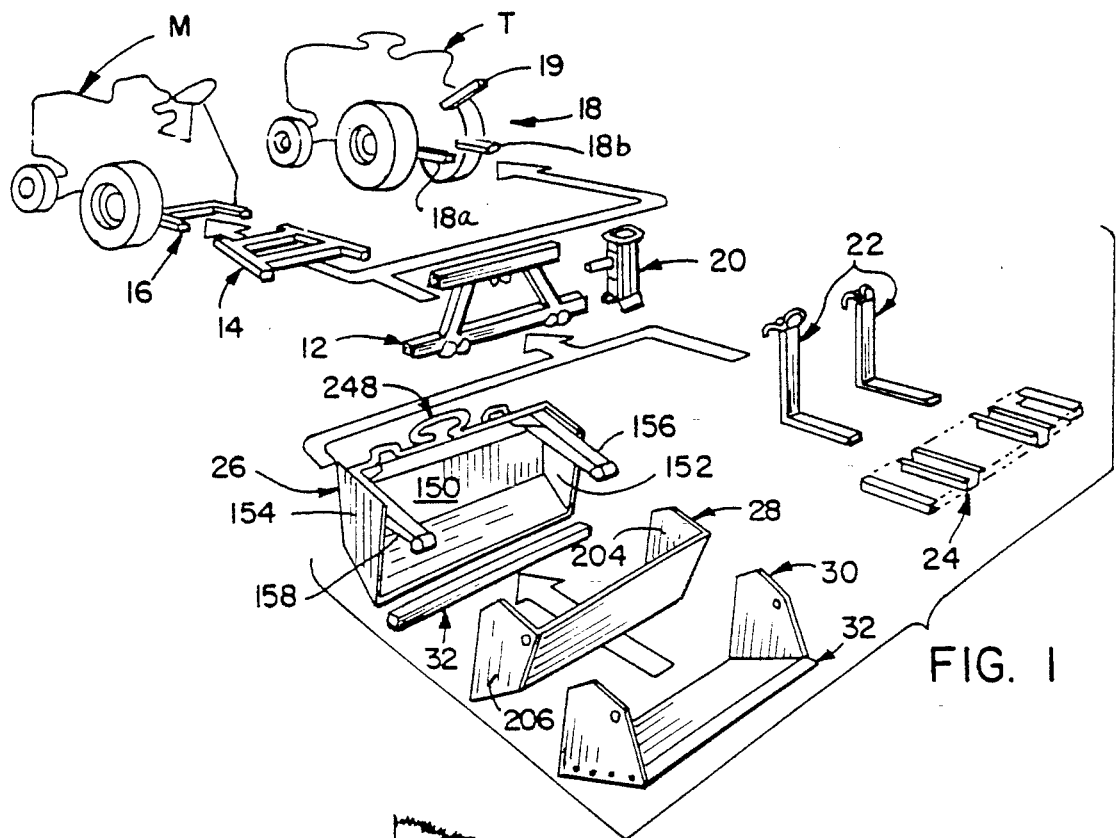
FIG. 1 is an exploded, perspective view of the implement mounting apparatus of the present invention showing the support frame and its attachment to either a three-point hitch or a front mount riding mower lift frame, as well as the various work implements which may be supported thereon alternatively or in combination.

Referring now to the drawings in greater detail, FIG. 1 illustrates in exploded fashion the implement mounting apparatus 10 of the present invention including a central support frame 12 which may be connected to either a front mount riding mower M or a rear attachment tractor T. The support frame 12 is adapted for connection to the front mount riding mower M by means of a mounting/lift frame 14 telescopically inserted into a rigid connection frame 16 at the bottom, front of the mower. Alternately, support frame 12 may be connected to the rear of a tractor T by means of three-point hitch connection 18 more fully described hereinafter. When mounted on the lift frame 14 or three-point hitch 18, support frame 12 may conveniently and interchangeably support one or a pair of tool supports 20 at the end or ends of the support frame, either alone or in combination with a pair of lift forks 22, a combination of a pair of lift forks 22 and a work platform 24, or a housing body 26 either alone or in combination with a hopper member 28, a scoop member 30 or a scraper blade assembly 32. As described more fully below, support frame 12 may be rigidly mounted on the lift frame 14 or three-point hitch 18, or pivotally mounted on such frame or hitch to allow the work implements described above to be raised and lowered for loading and hauling.

SUPPORT FRAME

With reference to FIGS. 2-6, support frame 12 is shown both alone and in combination with a hopper assembly suspended therefrom, tool support 20 mounted at either end of the support frame, all on a mounting/lift frame 14 on a front mount riding mower M. As is best seen in FIGS. 4-6, support frame 12 includes an upper support member 40, lower support member 42, and a pair of brace members 44, 46 which hold the upper support member 40 parallel to and in the same vertical plane as lower support member 42. Each of the support and brace members 40-46 is preferably formed from heavy gauge steel tubing having a square cross section as shown in FIG. 5. The ends of support members 40, 42 are capped with steel plates 40a, 40b and 42a, 42b. Circular apertures 48 extend through plates 40a, 40b while circular apertures 50 extend through plates 42a, 42b. Brace supports 44, 46 extend upwardly and inwardly toward one another from positions spaced inwardly from the end plates 42a, 42b and also lie in the same vertical plane with support members 40, 42. Upper support member 40 is shorter than lower support member 42 and the inward angling of braces 44, 46 both adequately supports the shorter upper support member and leaves the ends of the upper and lower support members free and exposed for attachment of work implements as described hereinafter. Cylindrical tubular inserts 52 are welded in the ends of upper frame member 40 prior to welding of end plates 40a, 40b thereover to provide support for insertion of a tool support through apertures 48 when desired. Similarly, cylindrical tubular inserts 54 are welded inside the ends of lower frame member 42. Apertures 56 and 58 extend through the top and bottom surfaces of upper and lower support members 40, 42 adjacent but spaced slightly inwardly from the end plates 40a, 40b and 42a, 42b as well as through tubular inserts 52, 54 on axes which are perpendicular to the longitudinal axes of support members 40, 42. Apertures 56, 58 receive securing pins for attaching tool support 20 at the ends of the support frame 12 as described below.

In order to allow attachment of the support frame 12 to a mounting/lift frame 14 or a three-point hitch connection 18, hinge plates or flanges 60 and 62a, 62b are provided in spaced positions where they will not interfere with the support of work implements either at the ends of frame 12, along the upper support surface on support member 40, or on the front side of the frame. Hinge plates or flanges 60, 62a, 62b are provided in spaced pairs as shown in FIGS. 4 and 6 which extend perpendicularly from the bottom surface of support member 40 or from the bottom and front side surfaces of lower support member 42. Hinge flanges 60 include apertures 64 while hinge flanges 62a, 62b include apertures 66a and 66b for receiving hinge pins for pivotally connecting the frame 12 to the frame 14 or three-point hitch 18. In addition, hinge flanges 62a, 62b include securing apertures 68a, 68b positioned on the front side of frame 12 for receiving securing pins or rods to secure and support the weight of any load on and the various work implements in position on the front side of frame 12. Thus, hinge flanges 62 double as both pivotal connection points for the attachment of support frame 12 to the mower or tractor, as well as for supporting, positioning and securing various of the work implements on the frame. Also, hinge flanges 60, 62 are positioned to avoid any interference with the hanging or suspension of work implements as described hereinafter.

CONNECTION TO MOUNTING/LIFT FRAME OR THREE-POINT HITCH

As shown in FIGS. 2, 3, 7, 8A and 9, the custom mounting/lift frame 14 for connecting the support frame 12 to various front mount riding mower M is a generally horizontal framework of rigid tubular steel having a rectangular cross section and including side members 70a, 70b. Side members 70a, 70b have three sections 72a, 74a, 76a and 72b, 74b and 76b welded together such that the side members converge toward one another from front to rear. The side members are interconnected by front and rear rectilinear cross members 78, 80, while cylindrical steel connecting members 82a, 82b are welded with their axes and through apertures 84 extending transverse to the direction of side member portion 72a, 72b. A pair of strut support plates 86 are welded to either the front or rear side of front cross member 78, each plate including a through aperture 88 for receiving a connecting pin. As shown in FIG. 7, strut support plates are on the rear side of cross member 78. Further, through apertures 90 are provided in rear side member portions 76a, 76b for receiving connecting pins to secure the frame to the mower connection frame 16.

In use, as shown in FIGS. 1-3 and 9, rear side portions 76a, 76b are telescopically inserted in correspondingly shaped, forwardly opening receptacles in connection frame 16 such that apertures 90 are aligned with similar apertures in the connection frame. Securing pins may then be inserted through the holes to hold the frames 14, 16 together. Thereafter, support frame 12 is attached to frame 14 by aligning apertures 84 and cylinders 82a, 82b with apertures 66a, 66b in hinge flanges 62a, 62b and inserting connection pins similar to those shown at 218 in FIG. 19 therethrough. Support frame 12 may thus pivot about a horizontal axis provided by apertures 66, 84 as shown in FIG. 8A.

In order to vertically support the frame, a rigid support strut 92 (FIG. 3) is mounted with connecting pins between apertures 88 in strut support plates 86 and apertures 64 in hinge flanges 60. Alternately, an extendable length, hydraulic cylinder 94 may be similarly positioned between apertures 88 and 64 again using connection pins similar to those shown at 218 in FIG. 19. As shown in FIG. 8A, using the extendable and retractable hydraulic cylinder 94 connected to the hydraulic system of the mower or tractor (not shown), the support frame 12 may be pivoted about apertures 84 on cylinders 82a, 82b on frame 14 from a vertical position to either a forwardly tipped position when cylinder 94 is extended or a rearwardly tipped position when cylinder 94 is retracted. This allows work implements supported on frame 12 to be tilted for various lifting purposes. In addition, front mount, riding mowers M typically include apparatus to raise and lower the entire connection frame 16 and thus mounting/lift frame 14 and support frame 12 simultaneously in addition to the pivoting of support frame 12 as shown in FIG. 8A.

Alternately, frame 12 may be easily mounted on a three-point hitch as shown in FIGS. 1, 8B and 12. Connection to the three-point hitch 18 also uses hinge flanges 60, 62a, 62b. Lift arms 18a, 18b projecting rearwardly from tractor T (FIG. 1) are connected via similar transverse steel cylinders 18d like cylinders 82a, 82b to hinge flanges 62a, 62b with connection pins similar to those used with frame 14. A top link 19 is pivotally connected to hinge flanges 60. Top link 19 may either be a rigid strut for vertical support of frame 12 or an extendable/retractable hydraulic cylinder 94' similar to the hydraulic cylinder used with frame 14. As shown in FIG. 8B, extension of the hydraulic cylinder 94' will pivot frame 12 forwardly while retraction will tip frame 12 rearwardly allowing tilting for various lifting purposes of any work implements on the frame. In addition, many tractors include lifting mechanisms for raising and lowering lift arms 18a, 18b as well as frame 12 connected thereto in addition to the forward and rearward pivotal motion of the frame 12 shown in FIG. 8B.

LIFT FORKS

With reference to FIGS. 1 and 9–12, a first of a series of work implements which may be suspended on support frame 12 include lift forks 22. As is best seen in FIGS. 10 and 11, lift forks 22 each include an upright or generally vertical leg 100 welded or otherwise rigidly secured to outwardly extending, generally horizontal leg 102 secured at a right angle to the upright leg 100. Leg 100 is preferably formed from a rigid steel tube having a rectangular cross section while leg 102 is preferably formed from rigid steel channel opening downwardly. The ends 104 of the side flanges of channel 102 may be inclined upwardly to form a taper allowing easy insertion of the legs 102 in a work platform as described below.

At the upper end of leg 100 is secured a positioning or locating hanger bracket 106 preferably formed from round steel rod and having an upstanding handle 108 and a rearwardly extending, L-shaped hanger portion 110 adapted to fit over and receive the top surface of upper channel 40 from frame 12. The downwardly extending, outer end 112 extends at a right angle to the remainder of hanger portion 110 and engages the rear surface of the upper frame member 40 to hold the fork on frame 12 even when it is tipped forwardly with the frame as in FIGS. 8A and 8B.

As shown in FIG. 10, any load applied downwardly on leg 102 of fork 22 is totally carried by a pin similar to 218 described hereinafter inserted through apertures 68a or 68b in flanges 62a or 62b.

As shown in FIGS. 9 and 12, forks 22 may be positioned at various horizontal positions along frame 12. Normal positioning is between the hinge/securing flanges 62a, 62b as shown in FIGS. 9 and 10 wherein either separate connecting pins such as those shown in FIG. 19 or a longer securing rod 114 may be passed through apertures 68a, 68b and corresponding apertures 116 extending laterally through upright legs 100 to provide support for the forks. Forks 22 are thus confined horizontally between the hinge flanges which hold them against the front side of frame 12 regardless of how the frame is pivoted.

Alternately, as shown in FIG. 12, forks 22 are positioned closer together by removing rod 114, positioning the forks on upper frame member 40 adjacent one another and reinserting the rod 114 through hinge/securing flanges 62a, 62b to support and hold the forks in position against the front side of the frame.

As shown in FIGS. 9 and 13, a work platform 120 may be used with a pair of lift forks 22. Work platform 120 preferably includes a plurality of equal length wooden planks or other elongated members 122 placed side-by-side and held together by rigid metal end channels 124 secured to the planks by appropriate threaded fasteners. A pair of channel members 126 is secured transverse to the longitudinal direction of planks 122 to create transverse openings 128 for receiving the ends 104 of horizontal legs 102 of lift forks 22. As shown in FIG. 9, work platform 120 may be placed with channels 126 down on a support surface adjacent the mower or tractor after lift forks 22 are secured on frame 12 in their normal positioning between hinge/securing flanges 62a, 62b. The tractor or mower with forks 22 may then be moved toward the work platform such that ends 104 are received in openings 128 and slid inwardly until one side edge of platform 120 engages upright legs 100. Frame 12, forks 22 and platform 120 may then be lifted by tipping frame 12 rearwardly using hydraulic cylinder 94, 94' or may be lifted using the lifting apparatus on the mower or tractor. Platform 120 thus provides a suitable support for carrying barrels or trash receptacles, trees, shrubs and bushes, and other large bulky objects which must be transported from place-to-place during yard maintenance.

TOOL ORGANIZER

As shown in FIGS. 2, 3 and 14–16, a tool support/organizer 20 may be fitted to and supported on either end of frame 12 to hold a variety of hand tools while other work implements are carried on the upper surface of upper frame member 40. Tool organizer 20 includes a plurality of upwardly opening, vertically oriented steel tubes 132 having closed bottoms welded together side-by-side such that their open ends extend upwardly. A separating plate 134 is welded atop tubes 132 and includes three apertures 136a, b and c therethrough registering with each of the openings to tubes 132. In order to attach tool organizer 20 on support frame 12, a side securing bracket or channel 138 is welded to one side of one of the tubes 132 and includes an outwardly extending cylindrical tube 140 projecting perpendicularly therefrom. Tube 140 includes a through aperture 142 for receiving a connecting pin 143 (FIG. 14) such as that shown at 218 in FIG. 19 therethrough and through apertures 56 in one or the other end of upper support member 40 on frame 12 to secure the tool organizer to the upper frame member. To prevent the bottom end of tool organizer 20 from swinging about tube 140, a securing channel 144 is positioned parallel to upper plate 134 and tubular member 140. Channel 144 is received over and straddles, and thus is mounted on, the upper surface of one extending end of lower frame member 42 as shown in FIG. 15. This prevents forward and rearward movement of the tool organizer. A drain hole 146 extends through the top wall of channel 144.

Figure 2:
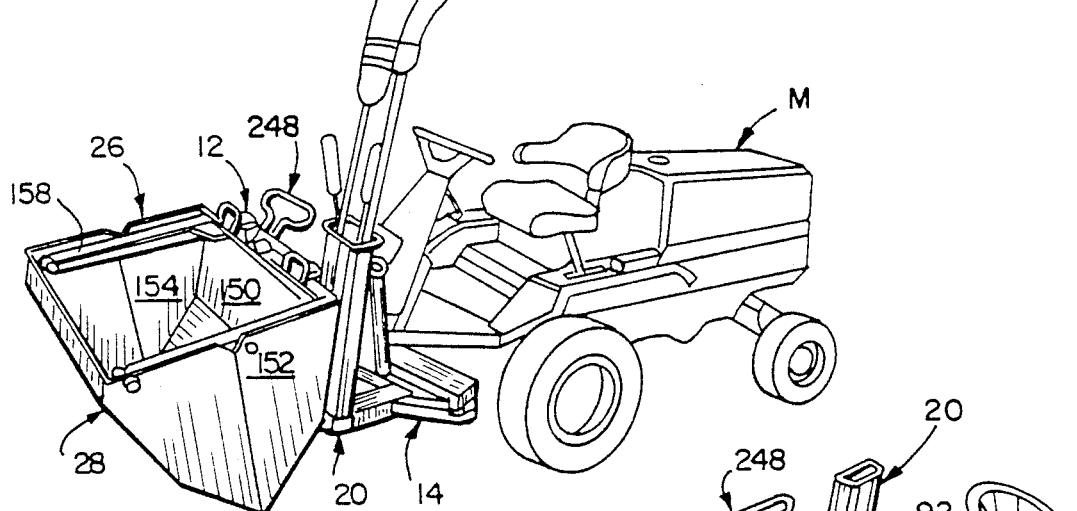
FIG. 2 is a perspective view of a conventional front mount riding mower incorporating the implement mounting apparatus of the present invention including the lift frame, support frame, hopper assembly and tool support.
Figure 3:
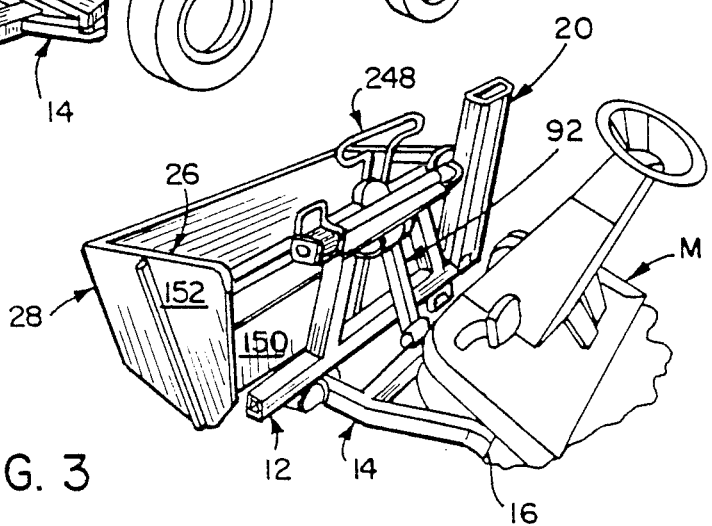
FIG. 3 is a perspective view of the implement mounting apparatus on a front mount riding mower including a hopper assembly but with the tool support mounted on the opposite end of the support frame from that shown in FIG. 2.

As shown in FIGS. 2 and 3, tool organizer 20 may be secured at either end of frame 12 by inserting tube 140 in one opening 48 and placing channel 44 over one of the extending ends of lower frame member 42 followed by insertion of pin 143 as mentioned above. When so positioned, tubes 132 project upwardly and may receive the ends of hand tools such as brooms, shovels, rakes, pruning shears and the like to securely transport them with the tractor or mower. Tool organizer 20 allows such support without interfering with the handling or carrying of other work implements such as the housing body 26, hopper member 28, scoop member 30 or the lift forks 22 and work platform 24, any of which may be carried simultaneously on frame 12 with tool organizer 20.

HOUSING BODY

Referring now to FIGS. 1 and 17-22, housing body 26, adapted for suspension on the flanges 62a and 62b or lower frame member 42 on frame 12, includes a body panel 150, end panels 152, 154 welded at or bolted to the ends of body panel 150 perpendicularly thereto, and outwardly extending support arms 156, 158 secured by bolts or other threaded fasteners to the inside surfaces of body panel 150 and end panels 152, 154 near the top edges thereof. Body panel 150 includes a generally vertical upper section 150a, an inwardly and downwardly inclined intermediate section 150b, and a more shallow, downwardly and inwardly inclined bottom section 150c all of which are preferably formed in one piece and stamped from heavy gauge aluminum sheet. An upper rim or flange 151 projects rearwardly from upper section 150a across the top of the housing body. On the outer surface of body panel 150 is secured a laterally extending, U-shaped channel bracket 160 for mounting the handle assembly 248 of a latch release assembly 240 to be more fully described below. A pair of handle/hooks 168 (FIG. 20) are inserted through a welded spacer tube 160a extending between top rim 151 and the top of channel bracket 160 and bolted in place with nut 160b. Also on the rear surface of panel 150 are a pair of spaced, cylindrical connecting or positioning members 162 welded to angle brackets 164, 166 which reinforce the bottom section 150c on the outside thereof. The spacing of brackets 164 and connecting members 162 corresponds to the spacing of hinge flanges 62a, 62b on frame 12 such that connecting pins 218 may be passed through apertures 68a, 68b and through apertures 163 in connecting members 162 to secure and support the housing body on the front side of frame 12 when it is positioned or located by and on top member 40 as shown in FIG. 20.

To position housing body 26, the pair of spaced handle/hook brackets 168 are passed through spacer tube 160a and bolted through top rim 151 and channel bracket 160 at the top edge of the housing body as shown in FIG. 20. Handle/hook brackets 168 are each formed from round steel wire and include an upwardly extending handle portion 170 welded to a laterally extending frame engaging portion 172 which may engage the top surface of support member 40 and having a downwardly extending free end 174 which engages the rear side of support member 40 in opposition to the lower part of handle portion 170 to firmly hold and position housing body 26 and prevent it from pivoting or tipping away from the upper surface of frame 12. Support for the weight of housing 26 and any load therein is borne by flanges 62a, 62b, connecting members 162 and pins 218. When mounted in this manner, housing body 26 slopes downwardly as shown in FIG. 20 when support frame 12 is positioned vertically.

As shown in FIGS. 1 and 22, each support arm 156, 158 is a mirror image of the other. For brevity, only arm 156 is described in detail. Arm 156 includes an elongated arm member 180 including a side section 182, a top flange 184 and an inwardly extending bottom flange 186, all of which are formed in one piece and stamped from rigid, heavy gauge sheet aluminum or the like. As is shown in FIGS. 18, 19, 21 and 22, a bearing support member 188 is welded to the outer end of arm member 180 to support a cylindrical bearing member 190 welded thereto. At the opposite or inner end of arm member 180 is welded a gusset member 192 having a rear flange 194 with a pair of spaced through apertures 195 allowing the end of the arm to be bolted to top section 150a of body panel 150. An additional aperture 196 in the middle of side panel 182 allows the arm member to be bolted adjacent the outer edge of end panel 152 such that the arm 156 will project outwardly substantially parallel to the top edge of end panel 152 and perpendicular to top section 150a.

As shown in FIGS. 21 and 22, bearing member 190 includes an outwardly and upwardly opening slot or recess 198 and a through aperture 200 which communicates with recess 198. Recess 198 is adapted to receive an inwardly projecting pivot member 214, 360 from hopper member 28, scoop member 30 or another implement to be combined with the housing body 26 as will be more fully described below.

HOPPER ASSEMBLY

As shown in FIG. 1, housing body 26 is adapted to receive hopper member 28 to form a clam-shell like, downwardly opening hopper assembly, a scoop member 30 to form a bucket-like scoop for digging into and lifting dirt, leaves, wood chips and the like, or a scraper member 32 to form a plow. In FIG. 21, assembly of the housing body 26 with hopper member 28 to form a multi-cubic foot capacity hopper assembly is illustrated. Hopper member 28 includes body panel 202 having an upper, slightly inwardly inclined section 202a and a downwardly and inwardly inclined bottom section 202b formed continuously therewith and stamped from heavy gauge sheet aluminum or the like. Welded to either end of hopper body panel 202 are spaced end panels 204, 206 extending perpendicularly thereto. Body panel 202 includes an upper rim or flange 208 extending inwardly of the hopper and providing a handhold for lifting the hopper member onto the support arms 156, 158. The inner, upper corner of end panels 204, 206 are cut away on the diagonal at 210 to provide clearance room for the arm securing bolt which secures arms 156, 158 to the housing body end panels 152, 154. At the lower edge of bottom section 202b of hopper body panel 202 is bolted an outwardly extending striker member 212 having a notched configuration adapted to mate with a corresponding latch member 242 in the releasable latch assembly 240 mounted on housing body 26 as described below. Preferably, a pair of strikers 212 are positioned one adjacent either end of the hopper member 28 for secure retention when the hopper assembly is closed. On the inner surfaces of end panels 204, 206 are secured cylindrical pivot members 214 extending through apertures in the end panels. Pivot members 214 each include a through aperture 216 adapted to receive a connecting pin 218 having a cylindrical pin body 219 and an enlarged head 220 (FIG. 19). The end of pin body 219 opposite head 220 includes a transverse through aperture which receives a second retaining pin 222 having a spring biased, pivotable ring 224 which may be moved under pin body 219 after insertion of pin 222 to prevent removal of the retaining pin from pin 219.

As is best seen in FIGS. 18, 19 and 21, hopper member 28 is mounted on housing body 26 by lifting via handhold flange 208 and placing pivot members 214 into the slots 198 at the ends of arms 156, 158. The center of gravity of hopper member 28 is positioned to the left of pivot 214 in FIG. 21. Hence, unless keeper 212 is held by latch member 242, the weight of hopper member 28 and/or the pressure from any material contained within the hopper assembly pressing against the downwardly and inwardly inclined bottom section 202b of hopper body panel 202 will cause the hopper member 28 to swing outwardly in the direction of the arrow in FIG. 21. When closed, however, with keeper member 212 held by latch member 242, the vertically extending bottom flange 202 of hopper body panel 202 will engage the vertically extending lower flange 150d of housing body panel 150 to tightly close the hopper assembly while the edges of panels 152, 204 and 154, 206 overlap one another to prevent escape of any material laterally from the hopper. Accordingly, pivot member 214 pivots about an axis through hole 200 and is held together with bearing member 190 by pin 218 to allow opening and closing hopper member 28 in clam-shell like fashion with respect to housing body 26. Hopper member 28 is retained on bearing members 190 by means of connecting pin assembly 218 as described above. Attachment and removal of the hopper member is, therefore, simple and convenient and requires removal of only two connecting pin assemblies 218, release of keeper 212 and lifting of the hopper member from the bearing members 190.

LATCH RELEASE ASSEMBLY

As shown in FIGS. 17, 17A, 21, 21A and 23–27, housing body 26 includes a latch release assembly 240 including latch member 242 pivotally mounted to a rotatable support rod 244 which is rotated by connecting rod assembly 246 and a pivotable handle assembly 248 which is movable between open, closed and locked positions. As shown in FIGS. 3 and 21, the latch release assembly 240 and handle assembly 248 are positioned centrally on the rear surface of housing body panel 150 and extend from the upper edge along its rear surface to its lower edge. Latch member 242 is pivotally secured to a circular mounting plate 252 on an axis offset from the axis of rod 244. In turn, plate 252 is bolted to a circular end flange 253 welded to the end of rotatable mounting rod 244. Latch member 242 includes a pair of spaced apertures, one receiving pivotal securing pin 251 while the other 253 is larger and receives a projecting pin member 254. Accordingly, latch member 242 is pivotable on plate 252 between a latched position and an open position without movement of plate 252 or rotatable rod 244 since retainer projection 254 is smaller than the inside diameter of aperture 253. Striker 212 may thus engage, rotate and mate with latch member 242 without releasing latch release assembly 240. Latch member 242 is, however, biased toward its closed position as shown in FIGS. 25B, 26B and 27B by a coil latching spring 256 engaged over a retaining projection 258 on a rear flange 260 of latch member 242 and a projection on spring pivot 262 rotatably mounted between end panels 252 or 254 and latch support plate 264 spaced slightly inwardly therefrom (FIG. 23). Striker 212 passes through a recess 266 at the end of body panel 150c as shown in FIG. 17A to engage latch member 242.

Rotatable mounting rod 244, plates 252 and 253 and latch member 242 are all rotatable in unison since rod 244 is rotatably mounted on a centrally located bushing block 266 and end plates 268 welded to the inside surfaces of latch support plates 264. A thrust bearing 270 is positioned between mounting hub 252 and end plate 268 to allow rotational motion.

Rotation is imparted to mounting rod 244, and thus latch member 242, by means of a connecting rod assembly 246 including adjustable length connecting rods 272, 274 (FIG. 21). Rod 272 extends between a bell crank member 276 rigidly secured to rod 244 adjacent center bracket 266 (FIGS. 21 and 23) and a central bell crank member 278 pivotally secured to bracket 280 extending rearwardly from the apex of housing body panel sections 150b, 150c. Likewise, connecting rod 274 extends between and is pivotally connected to bell crank member 278 and the lower end of handle assembly 248 (FIG. 21).

As will be best understood from FIGS. 21A and 24–27, handle assembly 248 includes a cylindrical spring housing 290 having a blind cylindrical bore 292 at its upper end receiving a cylindrical slide pin 294 having an enlarged head 296. An inner coil spring 298 is telescoped over slide pin 294 within bore 292. A top cap 300 is threaded into bore 292 to retain spring 298 and includes an enlarged stop flange 302 which also retains an outer coil spring 304 surrounding the exterior of housing 290 against the top surface of bracket 160. Likewise, an outer coil spring 306 is supported between the bottom surface of bracket 160 and stop flange 308 adjacent the lower end of spring housing 290. A through aperture 310 extends transversely through spring housing 290 at its lower end for pivotal connection to connecting rod 274 as described above. A through aperture 312 extends transversely through slide pin 294 at its upper end for connection to the pivotable handle member push rod 326.

With reference to FIG. 24, handle 320 is pivotally mounted on a U-shaped bracket 322 by means of a pivot rod 324 extending across and between the upstanding sides of the bracket. A vertically oriented slidable push rod 326 extends through aperture 328 in the bottom flange of bracket 322. Push rod 326 is hollow and connected via pin 330 to the upper end of slide rod 294 as shown in FIGS. 25A, 26A and 27A. Push rod 326 is, in turn, pivotally connected via pivot pin 332 and downwardly extending links 334 to connecting pins 336 which extend through the parallel, downwardly extending handle shaft portions 338 at one side of the loop-shaped handle 320.

As will now be understood from FIGS. 25–27, outer coil springs 304, 306 balance the position of handle assembly 248 such that handle 320 is positioned in its normal closed position as shown in FIG. 26A with aperture 310 positioned at level B. In such position, connecting pins 336 engage the inclined surface of the sides of bracket 322. Simultaneously, the connecting rod assembly 246 and rotatable rod assembly 244 hold latch member 242 in the position shown in FIG. 26B. As above because of the relative size difference between aperture 253 and retainer projection 254, latch member 242 can rotate slightly clockwise if struck by striker 212.

When handle 320 is pressed downwardly and counterclockwise by its outer end, push rod 326 is likewise moved downwardly against the biasing force of spring 304 via connecting pins 336, links 334 and pivot pin 332. Such motion pivots bell crank member 278 in a counterclockwise direction and bell crank member 276 in a clockwise direction forcing retaining member 254 against the upper edge of aperture 253 as shown in FIG. 25B. This rotates the latch member 242 in a clockwise direction against the biasing force of coil latching spring 256 to open the latch member and release keeper 212. Hopper member 28 may then pivot downwardly and outwardly to release and dump any material contained within the hopper assembly. In such position, the aperture 310 at the lower end of spring housing 290 is moved downwardly to level A with respect to the normal closed level B.

On the other hand, if it is desired to lock the latch member 242 in its closed position, handle 320 is pivoted in a clockwise direction about rod 324. Such motion pulls slide rod 294 upwardly against the biasing force of inner coil spring 298 by means of pivot pin 332, links 334 and connecting pins 336. Continued rotation of the handle 320 in the clockwise direction after slide pin 294 reaches the upper extent of its vertical travel swings links 334 in a counterclockwise direction (as shown by comparing FIGS. 26A and 27A) until connecting pins 336 engage the upper edge of the sides of bracket 322 (FIG. 27A). The force of inner coil spring 298 against top cap 300 lifts spring housing 290 and connecting rod assembly 246 to level C in FIG. 27A. Such spring force also urges slide pin 294 downwardly via enlarged head 296 to hold connecting pins 336 against the bracket 322 and handle 320 in the overcenter locked position. The upward force of coil spring 298 acting against top cap 300 pulls spring housing 290 and connecting rods 272, 274 upwardly causing slight rotation of bell crank members 278, 276 and rod 244 in the counterclockwise direction. This slightly rotates retainer projection 254 in the counterclockwise direction within aperture 253 such that it engages the opposite side of aperture 253 from that engaged in FIG. 25B. Thus, latch member 242 is held in the closed position and is prevented from rotating in the clockwise direction against the force of coil spring 256 as shown in FIG. 27B. Hence, by rotating handle 320 between its closed, open and overcenter locked positions, latch member 242 may be opened, locked closed or held in a closed position, the closed position allowing slight clockwise movement against the force of coil spring 256 to engage and hold striker 212 when striker 212 engage the end of latch member 242 upon the closing of hopper member 228.

SCOOP ASSEMBLY

Referring now to FIGS. 1 and 28-32, an alternative work implement for mounting on frame 12 is a multicubic foot scoop assembly including housing body 26 and scoop member 30 secured together. Scoop member 30 includes a bottom panel 350 having downwardly bent, front and rear end flanges 352, 354 formed continuously therewith, and end panels 356, 358 bolted to the ends of bottom panel 350 and extending perpendicularly thereto. Pivot members 360 (FIG. 29A) are mounted to extend inwardly from end panels 356, 358 and include through apertures 362 for receiving connecting/ securing pins such as those shown at 218 in FIG. 19. Flange 352 provides a handhold for lifting scoop member 30 and placing inwardly projecting cylindrical pivots 360 within slots or recesses 198 in bearing members 190 in the same fashion as described for hopper member 28 and as shown in FIGS. 18 and 19. The upper rear corner 366 is cut away between top edge 357 and rear edge 359 of each end panel to provide clearance for the support arm securing bolt as shown in FIG. 28. Rear end flange 354 includes a pair of spaced striker members 364 (FIG. 29) similar to striker members 212 and extending outwardly from either end of the scoop member 30 for secure retention by corresponding latch members 242 in the releasable latch assembly 240 mounted on housing body 26 as described above. Each of the striker members 364 is bolted to flange 354 and extends through an appropriate recess 266 at the ends of the body panels of housing body 26 to allow engagement with latch members 242 as described above.

The forward edge of the scoop assembly along flange 352 receives scraper blade assembly 32 which is also bolted in place as is best seen in FIGS. 29, 31 and 32. Scraper blade assembly 32 includes a V-shaped scraper member having a leading edge 372, a forwardly and downwardly inclined leg 374 and a rearwardly extending leg 376 providing a sacrificial wear surface which supports the scoop member when lowered to slide or skid along pavement or another support surface during use. A side plate 378 is welded to each end and includes an aperture 379 for bolting to side panels 356, 358 while additional bolts 380 are secured through aligned apertures in front flange 352 and apertures 382 in leg 372 to hold blade assembly 32 in place with scraper member 372 overlapping front flange 352. Thus, as shown in FIG. 29, scraper blade assembly 32 is rigidly secured to the front flange 352 of bottom panel 350 to extend forwardly to provide a scraping edge which forces material such as dirt, snow or the like upwardly and rearwardly into the interior of the scoop assembly formed by housing body 26 and scoop member 30 when the tractor or mower to which it is attached on frame 12 is driven in the direction of the scraper blade.

As is also shown in FIGS. 29 and 30, a pair of wear surfaces or skid shoes 385 is also included for supporting the scoop member adjacent rear flange 354 when the scoop assembly is lowered to slide or skid along pavement or the like during use. As is best seen in FIG. 30, each skid shoe 385 includes a bottom member 386 having upwardly bent, inclined, front and rear end flanges 388, 390 strengthened by a gusset member 392 extending longitudinally of the shoe along the top surface of the bottom member between flanges 388, 390 and welded in place. As shown in FIG. 29, the skid shoe is bolted in place adjacent and against the undersurface of bottom panel 350 and rear flange 354 by means of a pair of the bolts which also secure end panels 356, 358 to bottom panel 350 and which extend through apertures 355 in end plates 356, 358 and aligned apertures 394 in gusset 392. In addition, an aperture 396 is provided through rear flange 390 in shoe 385 to allow passage of a bolt therethrough and through an aperture in rear flange 354 to secure striker member 364 in place as shown in FIG. 29. Thus, when scoop member 30 is mounted with pivot members 360 in slots 198, and rear flange 354 is abutted against and engages lower edge flange 150d of housing body panel 150 such that striker members 364 are engaged with latch members 242, and the entire scoop assembly is lowered to the ground, pavement or other support surface, scoop member 30 will be supported on that surface by means of scraper blade assembly 32 at the front of the scoop member and skid shoes 385 at the rear of the scoop member.

Alternately, housing body 26 may be used as a more shallow scoop or plow by bolting scraper blade assembly 32 directly to the lower forward edge flange 150d on housing body 26 as shown in FIG. 1. In such case, bolts 380 extend through flange 150d and the converted housing body may be used in the same fashion as the scoop assembly described above. This assembly being shallower and having less retaining capacity than the scoop assembly of combined housing body 26 and scoop member 30, however, is more useful as a snow plow and for scooping and hauling dirt, wood chips or the like.

TRAILER CONVERSION OF SUPPORT FRAME

As shown in FIG. 33, an alternative use for support frame 12 is as a trailer to be towed behind tractors, riding mowers or other vehicles to allow movement of the work implements on frame 12 from place-to-place. This version of the invention is especially adapted for use with smaller tractors and mowers which do not have the capacity to lift and haul dirt, debris and other materials as do larger vehicles.

With reference to FIG. 33, the trailer version 400 of support frame 12 includes a support frame 12 identical to that described above but modified to include a pair of wheels 402 and tires 404 on either end thereof. Wheels/tires 402, 404 are rotatably mounted on a pair of identical wheel support brackets 406, one at either end of the support frame. Each bracket 406 includes a rectilinear connecting member 408 and a pair of cylindrical tubular members 410, 412 welded to extend perpendicularly inwardly from the same surface of connecting member 408. Tubular member 410 has an outside diameter corresponding to the inside diameter of tubular inserts 54 and apertures 50 in the ends of lower frame member 42. Tube 410 is telescopically received therein with insert 54 providing bearing support for the tubular member 410. A retaining pin 416 is inserted through aligned apertures 58 in lower support member 42 and aperture 414 in tubular member 410 to retain the wheel support bracket 408 in a downwardly extending position as shown in FIG. 33.

The lower tubular members 412 on brackets 408 receive therebetween a continuous, rectilinear cylindrical rod 418 forming an axle which connects members 412 and supports the pair of wheels 402 and tires 404. Tubular members 412 are sufficiently long and include a cylindrical opening to receive the ends of axle 418 telescopically until the ends of tubular members 412 abut stop flanges 420 secured on the axle inwardly from its ends. Axle 418 is secured in tubular members 412 by connecting pins 422 passed through aligned apertures 424, 426 in the tubular member and axles. Wheels 402 are mounted on the outside of brackets 408 by means of cylindrical projections 428 telescopically received in cylindrical, inwardly extending bearing tubes 430 mounted on the interior of wheels 402. A retaining fastener 432 may be passed from the exterior of wheel 402 into projection 430 to retain the wheel and tire thereon in conventional fashion.

Central frame 12 with wheel support brackets 406 and wheels 402 and tires 404 thereon may be moved by towing via tow bar frame 440. Tow bar 440 includes a rigid steel framework including outwardly angled frame members 442, cross member 444 and tongue member 446. Tongue member 446 extends rearwardly from frame members 442 to cross member 444. The rear ends of frame members 442 are pinned between hinge flanges 62a, 62b similarly to frame 14. Support flanges 448 are provided on the forward side of cross member 444 for attaching a support strut 450 connected to the underside of support member 40 by means of hinge flanges 60 in the same manner as support struts 92 and hydraulic cylinders 94, 94' are supported as described above. A hitch 452 may be secured to the end of tongue member 446 for attachment of the support frame trailer to a vehicle for towing purposes.

As will thus be understood, the various work implements described herein and shown in FIG. 1 may each be mounted and supported on frame 12 modified for use as a trailer, either alone or in combination with tool organizer 20 at the ends of support frame 12 in the same manner as described above for the versions mounted on mounting/lift frame 14 or three-point connection 18. It is also possible to substitute a hydraulic cylinder for support strut 450 such that frame 12 may be pivoted forwardly and rearwardly as shown in FIGS. 8A and 8B when used as a trailer. Tow bar framework 440 is pivotally connected to the ends of frame members 442 via hinge flanges 62a, 62b in such case.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. An implement mounting apparatus for use with vehicles such as tractors and riding front mowers comprising:

a support frame for mounting and holding at least one work implement during use;

said frame including a first support member extending generally horizontally and having opposite ends;

a second support member also extending generally horizontally, having opposite ends and spaced below said first support member, and including support means for supporting at least one work implement on said frame for access and use on one side of said frame;

a pair of brace members extending between and spacing said first and second support members vertically apart from one another;

said first support member including upper surface means for positioning the work implement when supported on said one side;

hitch means on said first and second support members for mounting said frame on a mount on at least one of a tractor, a front mower and a tow bar, said hitch means spaced inwardly from the ends of said support members to leave said ends free and exposed and being positioned on said support members to avoid interference with said upper surface means, said support means, and any work implement supported thereon;

attachment means at at least one end of one of said first and second support members for securing at least one work implement to said frame at said one end; and a tool support removably mounted on said attachment means at one end of one of said first and second support members, said tool support including at least one upwardly opening compartment for receiving and supporting a tool therein.

2. The apparatus of claim 1 wherein said tool support includes a projection for connection to said first support member and means for engaging said second support member; said first support member including means for receiving said projection on said tool support; whereby said tool support is generally vertically supported adjacent the ends of said support member.

3. An implement mounting apparatus for use with vehicles such as tractors and riding front mowers comprising:

a support frame for mounting and holding at least one work implement during use;

said frame including a first support member extending generally horizontally and having opposite ends;

a second support member also extending generally horizontally, having opposite ends and spaced below said first support member, and including support means for supporting at least one work implement on said frame for access and use on one side of said frame;

a pair of brace members extending between and spacing said first and second support members vertically apart from one another;

said first support member including upper surface means for positioning the work implement when supported on said one side;

hitch means on said first and second support members for mounting said frame on a mount on at least one of a tractor, a front mower and a tow bar, said hitch means spaced inwardly from the ends of said support members to leave said ends free and exposed and being positioned on said support members to avoid interference with said upper surface means, said support means, and any work implement supported thereon;

wheel support means for mounting a pair of spaced wheels on said frame such that said frame is mobile and may be towed by a vehicle such as a tractor or lawn mower;

said wheel support means including a pair of wheel support members, means for attaching said wheel support members to said opposite ends of said second frame member, and a pair of wheels rotatably mounted one on each of said wheel support members, said wheel support member extending in a first direction, said wheel members each being rotatable in a plane generally perpendicular to said first direction; and an axle interconnecting said wheel support members; said means for attaching said wheel support members to said ends of said second frame member including an opening in each end of said second frame member for telescopically receiving a corresponding projection from one of said wheel support members.

4. An implement mounting apparatus for use with vehicles such as tractors and riding front mowers comprising:

a support frame for mounting and holding at least one work implement during use;

said frame including a first support member extending generally horizontally and having opposite ends;

a second support member also extending generally horizontally, having opposite ends and spaced below said first support member, and including support means for supporting at least one work implement on said frame for access and use on one side of said frame;

a pair of brace members extending between and spacing said first and second support members vertically apart from one another;

said first support member including upper surface means for positioning the work implement when supported on said one side;

hitch means on said first and second support members for mounting said frame on a mount on at least one of a tractor, a front mower and a tow bar, said hitch means spaced inwardly from the ends of said support members to leave said ends free and exposed and being positioned on said support members to avoid interference with said upper surface means, said support means, and any work implement supported thereon; and a housing body removably mounted on said frame; said housing body including a body panel and a pair of spaced end panels, one end panel at either end of said body panel, said panels defining an open, scoop-shaped assembly; said housing body also including positioning means for positioning said housing body on said upper surface means, mounting means for removably connecting and supporting said housing body on said support means, and connecting means for attaching an additional implement to said housing body to form at least one of a hopper, scoop and plow.

5. The apparatus of claim 4 wherein said upper surface means include top and side surfaces of said first support member; said hitch means including securing means for securing said housing body in position on said one side of said frame by said mounting means when said housing body is positioned by said top and side surfaces; said securing means including spaced flanges projecting outwardly of said one side of said frame for connection to said mounting means; said positioning means including a pair of spaced hangers adjacent a top edge of said body panel for engaging said top and side surfaces of said first support member; said connecting means including a pair of support arms for supporting an additional implement such as hopper member or scoop member, one arm extending outwardly from each of said end panels, and fastening means at a bottom edge of said body panel for joining said body panel to an additional implement such as hopper member, scoop member or scraper member.

6. The apparatus of claim 4 wherein said connecting means include latch means for releasably connecting said housing body to an additional implement.

7. The apparatus of claim 4 including a hopper member pivotally mounted on said housing body, said hopper member having a body panel and a pair of spaced end panels, one end panel at either end of said body panel, said panels defining an open scoop-shaped assembly which opens toward said housing body; said connecting means including pivot means for pivotally attaching said hopper member in opposition to said housing body to form a clam-shell opening hopper assembly and latch means for releasing said hopper member to open at the bottom of said hopper assembly by allowing the bottom of said hopper member to swing away from the bottom of said housing body.

8. The apparatus of claim 7 wherein said connecting means include a pair of support arms for supporting said hopper member, one arm extending outwardly from each of said housing body end panels, said hopper member end panels each including a pivot member extending inwardly therefrom for engaging an upwardly and outwardly opening slot in one of said support arms whereby said hopper member pivots about said pivot members in said slots; said housing body panel and hopper body panel being inclined downwardly and inwardly toward one another whereby when said latch means is released, the weight of said hopper member and any material in said hopper assembly will pivotally open said hopper assembly to release the material downwardly.

9. The apparatus of claim 4 including a scoop member secured to said housing body, said scoop member including a bottom panel and a pair of spaced end panels, one end panel at either end of said bottom panel, said panels defining a generally U-shaped member; said connecting means joining said scoop member to said housing body such that said scoop member extends outwardly from said housing body panel and end panels.

10. The apparatus of claim 9 wherein said scoop member includes a free edge along said bottom panel and a scraper blade secured to said free edge.

11. The apparatus of claim 9 wherein said connecting means include a pair of support arms for supporting said scoop member, one arm extending outwardly from each of said housing body end panels, said scoop member end panels each including an inwardly projecting member for engaging an upwardly and outwardly opening slot in one of said support arms.

12. The apparatus of claim 4 wherein said housing body panel includes a bottom edge; and a scraper blade secured by said connecting means to said bottom edge of said housing body panel.

13. An implement mounting apparatus for use with vehicles such as tractors and riding front mowers comprising:

- a support frame for mounting and holding at least one work implement during use;
- said frame including a first support member extending generally horizontally and having opposite ends;
- a second support member also extending generally horizontally, having opposite ends and spaced below said first support member, and including support means for supporting at least one work implement on said frame for access and use on one side of said frame;
- a pair of brace members extending between and spacing said first and second support members vertically apart from one another;
- said first support member including upper surface means for positioning the work implement when supported on said one side;
- hitch means on said first and second support members for mounting said frame on a mount on at least one of a tractor, a front mower and a tow bar, said hitch means spaced inwardly from the ends of said support members to leave said ends free and exposed and being positioned on said support members to avoid interference with said upper surface means, said support means, and any work implement supported thereon; and
- a hopper assembly removably mounted on said support frame, said hopper assembly including an opposed pair of scoop-like body members, means for pivotally securing said scoop-like body members to one another to form an upwardly open, clam-shell like hopper which may be opened to release any material therein downwardly from the hopper bottom, positioning means for positioning said hopper assembly on said upper surface means, and mounting means for connecting and supporting said hopper assembly on said support means.

14. An implement mounting apparatus for use with vehicles such as tractors and riding front mowers comprising:

- a support frame for mounting and holding at least one work implement during use, said support frame having at least one support member and support means for positioning and supporting at least one work implement on said support frame for access and use on one side of said support frame;
- hitch means on said support frame for mounting said support frame on a mount on at least one of a tractor, a front mower and a tow bar;
- a housing body removably mounted on said support frame; said housing body including a body panel and a pair of spaced end panels, one end panel at either end of said body panel, said panels defining an open scoop-shaped assembly; said housing body also including mounting means for removably connecting and supporting said housing body on said support means, and connecting means for attaching an additional implement to said housing body to form at least one of a hopper, scoop and plow;
- a hopper member pivotally mounted on said housing body, said hopper member having a body panel and a pair of spaced end panels, one end panel at either end of said body panel, said panels defining an open scoop-shaped assembly which opens toward said housing body; said connecting means including pivot means for pivotally attaching said hopper member in opposition to said housing body to from a clam-shell opening hopper assembly and latch means for releasing said hopper member to open at the bottom of said hopper assembly by allowing the bottom of said hopper member to swing away from the bottom of said housing body; and
- said connecting means further including a pair of support arms for supporting said hopper member, one arm extending outwardly from each of said housing body end panels, said hopper member end panels each including a pivot member extending inwardly therefrom for engaging an upwardly and outwardly opening slot in one of said support arms whereby said hopper member pivots about said pivot members in said slots; said housing body panel and hopper body panel being inclined downwardly and inwardly toward one another whereby when said latch means is released, the weight of said hopper member and any material in said hopper assembly will pivotally open said hopper assembly to release the material downwardly.

15. An implement mounting apparatus for use with vehicles such as tractors and riding front mowers comprising:

- a support frame for mounting and holding at least one work implement during use, said support frame having at least one support member and support means for positioning and supporting at least one work implement on said support frame for access and use on one side of said support frame;
- hitch means on said support frame for mounting said support frame on a mount on at least one of a tractor, a front mower and a tow bar;
- a housing body removably mounted on said support frame; said housing body including a body panel and a pair of spaced end panels, one end panel at either end of said body panel, said panels defining an open scoop-shaped assembly; said housing body also including mounting means for removably connecting and supporting said housing body on said support means, and connecting means for attaching an additional implement to said housing body to form at least one of a hopper, scoop and plow; and wheel support means for mounting a pair of spaced wheels on said support frame such that said support frame is mobile and may be towed by a vehicle such as a tractor or front mower.

16. The apparatus of claim 15 wherein said wheel support means include a pair of wheel support members, means for attaching said wheel support members to opposite ends of said support frame, and a pair of wheels rotatably mounted one on each of said wheel support members, said support frame extending in a first direction, said wheel members each being rotatably in a plane generally perpendicular to said first direction.

17. The apparatus of claim 16 including a tow bar frame mounted to said hitch means, said tow bar frame extending outwardly on the side of said support frame opposite said one side and having a support strut extending upwardly to a portion of said hitch means on said support frame.

18. The apparatus of claim 16 including an axle interconnecting said wheel support members; said means for attaching said wheel support members to said ends of said support frame including an opening in each end of said support frame for telescopically receiving a corresponding projection from one of said wheel support members.

19. A work implement for use with vehicles such as tractors and riding front mowers comprising:
a housing body adapted to be removably mounted on a support frame attached to at least one of a tractor, a front mower and a tow bar, said housing body including a body panel and a pair of spaced end panels, one end panel at either end of said body panel, said panels defining an open scoop-shaped assembly;
said housing body also including support means for supporting said housing body from the support frame;
connecting means for attaching an additional implement to said housing body to form at least one of a hopper, scoop and plow;
a hopper member pivotally mounted on said housing body, said hopper member having a body panel and a pair of spaced end panels, one end panel at either end of said body panel, said panels defining an open scoop-shaped assembly which opens toward said housing body; said connecting means including pivot means for pivotally attaching said hopper member in opposition to said housing body to form a clam-shell opening hopper assembly and latch means for releasing said hopper member to open at the bottom of said hopper assembly by allowing the bottom of said hopper member to swing away from the bottom of said housing body; and
said connecting means also including a pair of support arms for supporting said hopper member, one arm extending outwardly from each of said housing body end panels, said hopper body end panels each including a pivot member extending inwardly therefrom for engaging an upwardly and outwardly opening slot in one of said support arms whereby said hopper member pivots about said pivot members in said slots; said housing body panel and hopper body panel being inclined downwardly and inwardly toward one another whereby when said latch means is released, the weight of said hopper member and any material in said hopper assembly will pivotally open said hopper assembly to release the material downwardly.

20. A work implement for use with vehicles such as tractors and riding front mowers comprising:
a housing body adapted to be removably mounted on a support frame attached to at least one of a tractor, a front mower and a tow bar, said housing body including a body panel and a pair of spaced end panels, one end panel at either end of said body panel, said panels defining an open scoop-shaped assembly;
said housing body also including support means for supporting said housing body from the support frame;
connecting means for attaching an additional implement to said housing body to form at least one of a hopper, scoop and plow; said connecting means including latch means for releasably connecting said housing body to an additional implement;
said body panel including a lower edge;
said latch means comprising:
a latch member for engaging and holding a striker on an additional implement when attached to said housing body;
rotatably mounting means for rotatably mounting said latch member for movement between a closed and an open position adjacent said lower edge of said body panel;
handle means mounted adjacent the top of said housing body for rotating said rotatably mounting means and latch member to allow release of any striker;
second connecting means for connecting said handle means and rotatably mounting means; and
biasing means for urging said latch member to a closed position.

21. The work implement of claim 20 wherein said biasing means include release means for moving said latch member to said open position when struck by the striker without moving said handle means, second connecting means or rotatable mounting means.

22. The work implement of claim 21 wherein said handle means includes a handle and pivot means for pivoting said handle between a closed, an open and a locked position.

23. The work implement of claim 21 wherein said pivot means include second biasing engaging said second connecting means for urging said handle to its closed position.

24. The work implement of claim 23 wherein said pivot means further includes third biasing means for holding said handle in said locked position.

25. The work implement of claim 21 wherein said rotatable mounting means includes a rod rotatably mounted on a first axis and extending across said housing body adjacent said lower edge, said rod including a plate having a retainer projecting outwardly therefrom; said latch member pivotally mounted on a second axis spaced from said first axis and having a aperture larger than said retainer receiving said retainer therein; said release means including a spring engaging said latch member and urging said latch member in one rotational direction about said second pivot axis to its closed position where said retainer engages one side of said latch member aperture, said spring being sufficiently compressible to allow rotation of said latch member about said second pivot axis in the opposite rotational direction to its open position where said retainer engages an opposite side of said latch member aperture when said latch member is struck or urged by a striker against said spring.

26. An implement mounting apparatus for use with vehicle such as tractors and riding front mowers comprising:
- a support frame for mounting and holding at least one work implement during use, said support frame having support means for positioning and supporting at least one work implement on said support frame for access and use on one side of said support frame;
- hitch means on said support frame for mounting said support frame on a tow bar frame for moving said apparatus from place-to-place;
- wheel support means for mounting a pair of spaced wheels on said support frame such that said support frame is mobile and may be towed by a vehicle such as a tractor or front mower;
- said wheel support means including a pair of wheel support members; means for attaching said wheel support members to opposite ends of said support frame, and a pair of wheels rotatably mounted one on each of said wheel support members, said support frame extending in a first direction, said wheel members each being rotatable in a plane generally perpendicular to said first direction; and
- an axle interconnecting said wheel support members; said means for attaching said wheel support members to said ends of said support frame including an opening in each end of said support frame for telescopically receiving a corresponding projection from one of said wheel support members.

27. An implement mounting apparatus for use with vehicles such as tractors and riding front mowers comprising:
- a support frame for mounting and holding at least one work implement during use, said support frame having support means for positioning and supporting at least one work implement on said support frame for access and use on one side of said support frame;
- hitch means on said support frame for mounting said support frame on a tow bar frame for moving said apparatus from place-to-place;
- wheel support means for mounting a pair of spaced wheels on said support frame such that said support frame is mobile and may be towed by a vehicle such as a tractor or front mower; and
- a housing body removably mounted on said support frame; said housing body including a body panel and a pair of spaced end panels, one end panel at either end of said body panel, said panels defining an open scoop-shaped assembly; said housing body also including mounting means for mounting said housing body on said support means, and connecting means for attaching an additional implement to said housing body to form at least one of a hopper, scoop and plow.

28. The apparatus of claim 27 including a hopper member pivotally mounted on said housing body, said hopper member having a body panel and a pair of spaced end panels, one end panel at either end of said body panel, said panels defining an open scoop-shaped assembly which opens toward said housing body; said connecting means including pivot means for pivotally attaching said hopper member in opposition to said housing body to form a clam-shell opening hopper assembly and latch means for releasing said hopper member to open at the bottom of said hopper assembly by allowing the bottom of said hopper member to swing away from the bottom of said housing body.

29. An implement mounting apparatus for use with vehicles such as tractors and riding front mowers comprising:
- a support frame for mounting and holding at least one work implement during use, said support frame having support means for positioning and supporting at least one work implement on said support frame for access and use on one side of said support frame;
- hitch means on said support frame for mounting said support frame on a tow bar frame for moving said apparatus from place-to-place;
- wheel support means for mounting a pair of spaced wheels on said support frame such that said support frame is mobile and may be towed by a vehicle such as a tractor or front mower; and
- a hopper assembly on said frame, said hopper assembly including an opposed pair of scoop-like body members, means for pivotally securing said scoop-like body members to one another to form an upwardly open, clam-shell like hopper which may be opened to release any material therein downwardly from the hopper bottom, and mounting means for mounting said hopper assembly on said support means.

* * * * *

UNITED STATES PATENT AND TRADEMARK OFFICE
CERTIFICATE OF CORRECTION

PATENT NO. : 5,064,338
DATED : November 12, 1991
INVENTOR(S) : Phillip G. Lawrence It is certified that error appears in the above-identified patent and that said Letters Patent is hereby corrected as shown below:

Column 10, line 50:

"out away" should be --cut away--

Column 11, line 19:

"flange 202" should be --flange 202C--

Column 17, line 44, claim 3:

"wheel support" should be --second support--

Column 20, line 32, claim 14:

"from" should be --form--

Column 21, line 17, claim 16:

"rotatably" should be --rotatable--

Column 22, line 29, claim 20:

"rotatably" (first occurrence) should be --rotatable--

Column 22, line 34, claim 20:

"rotatably" should be --rotatable--

UNITED STATES PATENT AND TRADEMARK OFFICE
CERTIFICATE OF CORRECTION

PATENT NO. : 5,064,338

DATED : November 12, 1991

INVENTOR(S) : Phillip G. Lawrence

It is certified that error appears in the above-identified patent and that said Letters Patent is hereby corrected as shown below:

Column 22, line 38, claim 20:

"rotatably" should be --rotatable--

Column 22, line 51, claim 23:

After "biasing" insert --means--

Column 22, line 63, claim 25:

"having a" should be --having an--

Column 23, line 9, claim 26:

"vehicle" should be --vehicles--

Signed and Sealed this

Fourth Day of May, 1993

Attest:

MICHAEL K. KIRK

Attesting Officer

Acting Commissioner of Patents and Trademarks